United States Patent
Ivanov et al.

(10) Patent No.: US 12,372,742 B2
(45) Date of Patent: Jul. 29, 2025

(54) WIDE-FIELD IMAGING LENS AND OPTICAL IMAGE CAPTURING DEVICE FOR ELECTRONIC MOBILE DEVICES

(71) Applicant: SAMSUNG ELECTRONICS CO., LTD., Suwon-si (KR)

(72) Inventors: Stepan Evgenievich Ivanov, Saint-Petersburg (RU); Viktoria Sergeevna Kaidarakova, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 542 days.

(21) Appl. No.: 17/244,529

(22) Filed: Apr. 29, 2021

(65) Prior Publication Data

US 2021/0356695 A1  Nov. 18, 2021

(30) Foreign Application Priority Data

May 15, 2020 (RU) ................................ 2020115966
Mar. 4, 2021 (KR) ........................ 10-2021-0028621

(51) Int. Cl.
*G02B 9/60* (2006.01)
*G02B 13/06* (2006.01)
*G02B 13/18* (2006.01)

(52) U.S. Cl.
CPC .............. *G02B 9/60* (2013.01); *G02B 13/06* (2013.01); *G02B 13/18* (2013.01)

(58) Field of Classification Search
CPC .......... G02B 9/60; G02B 13/06; G02B 13/18; G02B 13/006; G02B 27/0056; G02B 13/0045
See application file for complete search history.

(56) References Cited

U.S. PATENT DOCUMENTS

| | | |
|---|---|---|
| 8,520,324 B2 | 8/2013 | Chen |
| 9,036,275 B2 | 5/2015 | Fukuta et al. |
| 9,223,117 B2 | 12/2015 | Chen et al. |
| 9,310,585 B2 | 4/2016 | Park |
| 9,470,876 B2 | 10/2016 | Son |
| 9,482,846 B2 | 11/2016 | Kwon et al. |
| 9,638,888 B2 | 5/2017 | Chen et al. |
| 9,658,434 B2 | 5/2017 | Lee et al. |

(Continued)

FOREIGN PATENT DOCUMENTS

| | | |
|---|---|---|
| CN | 201378216 Y | 1/2010 |
| CN | 102313970 B | 1/2012 |

(Continued)

OTHER PUBLICATIONS

Wikipedia article "Lenses", published Nov. 2019, pp. 1 and 8.*
Wikipedia Page "Lens", May 2018 (Year: 2018).*

*Primary Examiner* — George G. King
*Assistant Examiner* — Anna Smith
(74) *Attorney, Agent, or Firm* — Sughrue Mion, PLLC

(57) ABSTRACT

A wide-field imaging lens and an optical image capturing device for an electronic mobile device are provided. In the wide-field imaging lens, an aperture stop, a first lens element, a second lens element, a third lens element, a fourth lens element, and a fifth lens element may be sequentially located and optically coupled. A surface of each of the first lens element to the fifth lens element may be an aspheric surface.

17 Claims, 17 Drawing Sheets

(56) References Cited

U.S. PATENT DOCUMENTS

| | | | |
|---|---|---|---|
| 9,746,642 B2 | 8/2017 | Shin et al. | |
| 9,798,110 B2 | 10/2017 | Lee et al. | |
| 9,964,736 B2 | 5/2018 | Lee | |
| 10,088,652 B2 | 10/2018 | Jeon et al. | |
| 12,019,222 B2 * | 6/2024 | Huang | G02B 9/62 |
| 12,092,900 B2 * | 9/2024 | Son | G02B 9/62 |
| 2010/0254029 A1 * | 10/2010 | Shinohara | G02B 9/60 |
| | | | 359/764 |
| 2013/0033637 A1 * | 2/2013 | Sano | G02B 13/0045 |
| | | | 348/340 |
| 2013/0070346 A1 * | 3/2013 | Hsu | G02B 13/0045 |
| | | | 359/713 |
| 2015/0355438 A1 * | 12/2015 | Tang | G02B 27/0025 |
| | | | 348/335 |
| 2016/0116705 A1 | 4/2016 | Lee et al. | |
| 2016/0139371 A1 | 5/2016 | Lee et al. | |
| 2017/0045714 A1 * | 2/2017 | Huang | G02B 13/0045 |
| 2017/0176720 A1 | 6/2017 | Zhao et al. | |
| 2019/0094494 A1 * | 3/2019 | Hsu | G02B 13/0045 |
| 2019/0113714 A1 | 4/2019 | Hsueh et al. | |
| 2019/0129149 A1 | 5/2019 | Yao | |
| 2019/0212530 A1 * | 7/2019 | Yamahiro | G02B 9/64 |
| 2020/0241250 A1 * | 7/2020 | Kim | G02B 13/24 |
| 2020/0249440 A1 * | 8/2020 | Wenren | G02B 27/0025 |

FOREIGN PATENT DOCUMENTS

| | | | |
|---|---|---|---|
| CN | 102890330 B | 1/2013 | |
| CN | 103676087 B | 3/2014 | |
| CN | 104749744 B | 6/2017 | |
| CN | 108227156 A | 6/2018 | |
| JP | 5426313 B2 | 2/2014 | |
| JP | 5607398 B2 | 10/2014 | |
| KR | 10-2010-0042067 A | 4/2010 | |
| KR | 20160092980 A * | 8/2016 | |
| KR | 10-1734037 B1 | 5/2017 | |
| KR | 10-2004423 B1 | 7/2019 | |
| TW | 201215942 A * | 4/2012 | G02B 13/0045 |
| WO | WO-2015170745 A1 * | 11/2015 | G02B 13/0095 |

* cited by examiner

WIDE-FIELD IMAGING LENS AND OPTICAL IMAGE CAPTURING DEVICE FOR ELECTRONIC MOBILE DEVICES

CROSS-REFERENCE TO RELATED APPLICATIONS

This application claims priority from Russian Patent Application No. 2020115966 filed on May 15, 2020 in the Russian Federal Service for Intellectual Property, and Korean Patent Application No. 10-2021-0028621, filed on Mar. 4, 2021, in the Korean Intellectual Property Office, the disclosures of which are incorporated herein by reference in their entireties.

BACKGROUND

1. Field

Methods and apparatuses consistent with example embodiments relate to a wide-field imaging lens and an optical image capturing device including the wide-field imaging lens for an electronic mobile device, for example, a mobile phone, a smartphone or a tablet, including a personal digital assistant (PDA) scanner, a web camera and a portable digital camera.

2. Description of Related Art

With the growing popularity of portable devices such as smartphones and tablets, there have been increasing demands for compact optical imaging devices such as image capturing devices, lenses, or lens arrays that provide high-resolution images at a low focal number (F-number). Compact optical imaging systems with high quality have become a staple in the market.

The development of image sensors in the modern market is accompanied by a decrease in a sensor pixel size, which in turn inevitably puts forward requirements for creation of compact high-resolution lenses.

At the same time, it is difficult to simultaneously achieve a high image quality, a wide field of view, a high aperture ratio, and a small number of lens elements.

In this case, to obtain a high-resolution image, the following conditions may need to be satisfied:
- a low focal number (hereinafter, referred to as an F-number) <2.0, determined by a ratio of a focal length of a lens to a diameter of an aperture, and setting a diffraction limit of a resolution;
- a function of correcting aberrations to values of geometric aberrations comparable to a diameter of a lens Airy diffraction disk;
- a possibility of forming a surface profile of an imaging lens. Optical lenses on the market with the above properties have complex surface profiles that require a high precision in manufacturing; and
- a compact design used for mass production (with short, e.g., comparable to a focal length, a total objective length (TTL), and a small number of elements in a lens arrangement).

However, lenses in the related art have an issue of a relatively low resolution or an issue of a rather large total objective length.

Thus, there is a desire for technology of increasing a resolution and miniaturizing a wide-field imaging lens.

SUMMARY

One or more example embodiments may address at least the above problems and/or disadvantages and other disadvantages not described above. Also, the example embodiments are not required to overcome the disadvantages described above, and an example embodiment may not overcome any of the problems described above.

One or more example embodiments of the present disclosure may provide a compact imaging lens that is capable of capturing an image with a high optical efficiency and a high resolution under physical constraints imposed by an electronic device.

According to an aspect of an example embodiment, there is provided a wide-field imaging lens that includes an aperture stop, a first lens element, a second lens element, a third lens element, a fourth lens element, and a fifth lens element that are located along an optical axis in a sequence from an object side to an image side. In the wide-field imaging lens, each of the first lens element, the second lens element, the third lens element, the fourth lens element, and the fifth lens element may have an aspheric surface. The first lens element may have a first positive refractive power, a first object-side surface, and a first image-side surface. The second lens element may have a first negative refractive power, a second object-side surface that is convex in a paraxial region of the second object-side surface, and a second image-side surface that is concave in a paraxial region of the second image-side surface. The third lens element may have a second positive refractive power, a third object-side surface that is convex in a paraxial region of the third object-side surface, and a third image-side surface that is convex in a paraxial region of the third image-side surface. The fourth lens element and the fifth lens element may have opposite refractive powers. The fourth lens element may have a fourth object-side surface that is concave in a paraxial region of the fourth object-side surface, and a fourth image-side surface that is convex in a paraxial region of the fourth image-side surface. The fifth lens element may have a fifth object-side surface that is convex in a paraxial region of the fifth object-side surface, and a fifth image-side surface that is concave in a paraxial region of the fifth image-side surface.

The first object-side surface of the first lens element may be convex in a paraxial region of the first object-side surface, and the first image-side surface of the first lens element may be convex in a paraxial region of the first image-side surface.

The first object-side surface of the first lens element may be concave in a paraxial region of the first object-side surface, and the first image-side surface of the first lens element may be convex in a paraxial region of the first image-side surface.

The fourth lens element may have a third positive refractive power, and the fifth lens element may have a second negative refractive power.

The fourth lens element may have a second negative refractive power, and the fifth lens element may have a third positive refractive power.

The first lens element to the fifth lens element may be configured to satisfy Equations 1 to 8 shown below.

$$1.19 < (f1/f) \cdot (1/n1) < 1.35 \qquad \text{[Equation 1]}$$

$$-1.71 < (f2/f) \cdot (1/n2) < -0.94 \qquad \text{[Equation 2]}$$

$$0.48 < (f3/f) \cdot (1/n3) < 1.00 \qquad \text{[Equation 3]}$$

$$0.033 < \left(\frac{f1}{f}\right) \cdot \left(\frac{1}{v1}\right) < 0.048 \qquad \text{[Equation 4]}$$

-continued $$-0.110 < (f2/f) \cdot (1/\nu 2) < -0.060 \quad \text{[Equation 5]}$$

$$0.013 < (f3/f) \cdot (1/\nu 3) < 0.027 \quad \text{[Equation 6]}$$

$$0.34 < OT/TTL < 0.5 \quad \text{[Equation 7]}$$

$$|\nu_4 - \nu_5| > 18.0 \quad \text{[Equation 8]}$$

In Equations 1 to 8, f denotes a focal length of the wide-field imaging lens, $f_1$ denotes a focal length of the first lens element, $f_2$ denotes a focal length of the second lens element, $f_3$ denotes a focal length of the third lens element, $n_1$ denotes a refractive index of the first lens element, $n_2$ denotes a refractive index of the second lens element, $n_3$ denotes a refractive index of the third lens element, $v_1$ denotes an Abbe number of the first lens element, $v_2$ denotes an Abbe number of the second lens element, $v_3$ denotes an Abbe number of the third lens element, $v_4$ denotes an Abbe number of the fourth lens element, $v_5$ denotes an Abbe number of the fifth lens element, OT denotes an overall thickness of the first lens element, the second lens element and the third lens element, and TTL denotes an axial distance between the first object-side surface of the first lens element and an image surface.

The wide-field imaging lens may further include a diffractive optical element (DOE) applied to at least one surface of at least one of the first lens element to the fifth lens element.

The DOE may have a relief-phase annular microstructure provided on a flat or curved surface with a pitch that corresponds to a wavelength of radiation.

The DOE may be configured and disposed to reduce chromatic aberrations and geometric aberrations.

At least one of the first lens element to the fifth lens element may be formed of plastic.

At least one of the first lens element to the fifth lens element may be formed of optical glass.

Equation 14 below may be satisfied.

$$1.545 < n < 1.743 \quad \text{[Equation 14]}$$

In Equation 14, n denotes a refractive index of each of the first lens element to the fifth lens element.

According to an aspect of another example embodiment, there is provided an optical image capturing device including a wide-field imaging lens, an infrared (IR) filter and a sensor that are optically coupled. The wide-field imaging lens may include an aperture stop, a first lens element, a second lens element, a third lens element, a fourth lens element, and a fifth lens element that are located along an optical axis in a sequence from an object side to an image side. Each of the first lens element, the second lens element, the third lens element, the fourth lens element, and the fifth lens element may have an aspheric surface, the first lens element may have a first positive refractive power, a first object-side surface, and a first image-side surface. The second lens element may have a first negative refractive power, a second object-side surface that is convex in a paraxial region of the second object-side surface, and a second image-side surface that is concave in a paraxial region of the second image-side surface. The third lens element may have a second positive refractive power, a third object-side surface that is convex in a paraxial region of the third object-side surface, and a third image-side surface that is convex in a paraxial region of the third image-side surface. The fourth lens element and the fifth lens element may have opposite refractive powers. The fourth lens element may have a fourth object-side surface that is concave in a paraxial region of the fourth object-side surface, and may have a fourth image-side surface that is convex in a paraxial region of the fourth image-side surface. The fifth lens element may have a fifth object-side surface that is convex in a paraxial region of the fourth object-side surface, and may have a fifth image-side surface of the fifth lens element that is concave in a paraxial region of the fifth image-side surface.

The first object-side surface of the first lens element may be convex in a paraxial region of the first object-side surface, and the first image-side surface of the first lens element may be convex in a paraxial region of the first image-side surface.

The first object-side surface of the first lens element may be concave in a paraxial region of the first object-side surface, and the first image-side surface of the first lens element may be convex in a paraxial region of the first image-side surface.

The fourth lens element may have a third positive refractive power, and the fifth lens element may have a second negative refractive power.

The fourth lens element may have a second negative refractive power, and the fifth lens element may have a third positive refractive power.

Equation 11 below may be satisfied.

$$0.32 < \frac{BFL}{f} < 0.33 \quad \text{[Equation 11]}$$

In Equation 11, BFL denotes a back segment of a focal length measured from the fifth image-side surface of the fifth lens element to an image surface, without including a depth of the IR filter.

Equation 17 below may be satisfied.

$$2.02 < \frac{TTL}{ImgH} < 2.13 \quad \text{[Equation 17]}$$

In Equation 17, TTL denotes an axial distance between the first object-side surface of the first lens element and an image surface, and ImgH denotes one-half of a diagonal length of a resulting image.

The sensor may be a photodetector array.

BRIEF DESCRIPTION OF THE DRAWINGS

The above and/or other aspects will be more apparent by describing certain example embodiments, taken in conjunction with the accompanying drawings, in which.

DETAILED DESCRIPTION

Figure 1A:
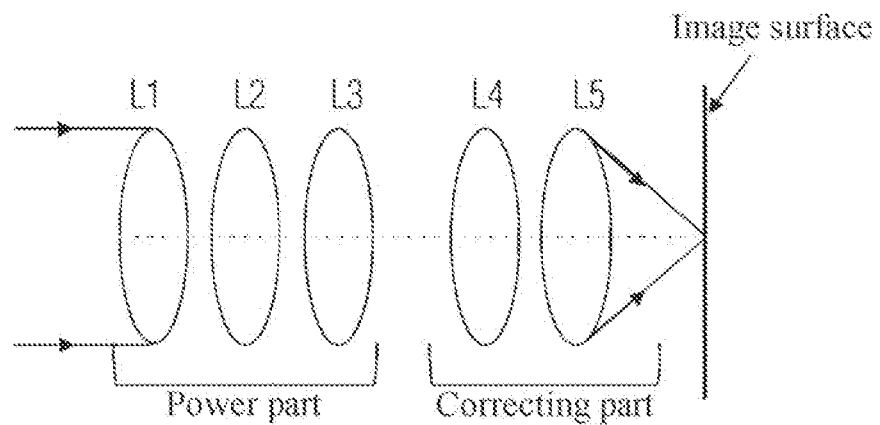
FIG. 1A is a diagram schematically illustrating a wide-field imaging lens according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

The terminology used herein is for the purpose of describing example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Unless otherwise defined herein, all terms used herein including technical or scientific terms have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, the terms "first," "second," "A," "B," "(a)," "(b)," and the like may be used herein to describe components according to example embodiments. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function with a component included in one example embodiment is described using a like name in another example embodiment. Unless otherwise described, description made in one example embodiment may be applicable to another example embodiment and detailed description within a duplicate range is omitted.

Hereinafter, a wide-field imaging lens and an optical image capturing device for an electronic mobile device according to example embodiments will be described in detail with reference to FIGS. 1 to 17.

The present disclosure provides a wide-field imaging lens and an optical image capturing device including the wide-field imaging lens that may have a higher image resolution while maintaining lens parameters, for example, a low F-number, a small number of lens elements, or a rather simple lens surface, to enable manufacturing in mass production while maintaining optical characteristics.

Also, the present disclosure provides a compact wide-field imaging lens and an optical image capturing device including the compact wide-field imaging lens for use in an electronic device. Main tasks solved by the present disclosure are described below.

- Providing a higher image resolution with lens parameters, for example, a low F-number <2, or a small number of lens elements (for example, five lens elements).
- Enabling a mass production while maintaining optical characteristics, with a rather simple profile of lens surfaces.
- Providing a compact wide-field imaging lens design used for a mass production, comparable to a focal length, a total lens length (TTL) and a small number of lens elements (for example, five lens elements) in a lens arrangement.

Hereinafter, examples of a wide-field imaging lens and an optical image capturing device including the wide-field imaging lens will be described with reference to FIGS. 1 to 17 and Tables 1 to 9.

Lens elements in a wide-field imaging lens according to the present disclosure may be typically combined into groups, and one of the groups may be classified into a "power part" that contributes to refractive power (optical power) or a "correcting part" that functions to correct various aberrations.

A wide-field imaging lens including five lens elements according to the present disclosure is shown in FIG. 1A.

FIG. 1A is a diagram schematically illustrating a wide-field imaging lens according to an example embodiment.

In the present disclosure, a relationship between lens parameters of a wide-field imaging lens is identified through experimental studies, and a high resolution is provided to the wide-field imaging lens. The wide-field imaging lens according to the present disclosure includes five lens elements, as shown in FIG. 1A. In this example, a first lens element L1, a second lens element L2, and a third lens element L3 may form a power part, and a fourth lens element L4 and a fifth lens element L5 may form a lens correcting part and may be configured to correct geometric aberrations and chromatic aberrations.

In the present disclosure, Equations 1 to 8 below may be satisfied.

$$1.19 < (f1/f) \cdot (1/n1) < 1.35 \quad \text{[Equation 1]}$$

$$-1.71 < (f2/f) \cdot (1/n2) < -0.94 \quad \text{[Equation 2]}$$

$$0.48 < (f3/f) \cdot (1/n3) < 1.00 \quad \text{[Equation 3]}$$

$$0.033 < \left(\frac{f1}{f}\right) \cdot \left(\frac{1}{v1}\right) < 0.048 \quad \text{[Equation 4]}$$

$$-0.110 < (f2/f) \cdot (1/v2) < -0.060 \quad \text{[Equation 5]}$$

$$0.013 < (f3/f) \cdot (1/v3) < 0.027 \quad \text{[Equation 6]}$$

$$0.34 < OT/TTL < 0.5 \quad \text{[Equation 7]}$$

$$|v_4 - v_5| > 18.0 \quad \text{[Equation 8]}$$

In Equations 1 to 8, f denotes a focal length of the wide-field imaging lens, $f_1$ denotes a focal length of the first lens element L1, $f_2$ denotes a focal length of the second lens element L2, $f_3$ denotes a focal length of the third lens element L3, $n_1$ denotes a refractive index of the first lens element L1, $n_2$ denotes a refractive index of the second lens element L2, $n_3$ denotes a refractive index of the third lens element L3, $v_1$ denotes an Abbe number of the first lens element L1, $v_2$ denotes an Abbe number of the second lens element L2, $v_3$ denotes an Abbe number of the third lens element L3, $v_4$ denotes an Abbe number of the fourth lens element L4, $v_5$ denotes an Abbe number of the fifth lens element L5, OT denotes an overall thickness of the first lens element L1, the second lens element L2 and the third lens element L3, and TTL denotes an axial distance between an object-side surface of the first lens element L1 and an image surface, that is, a total length of the wide-field imaging lens.

In this case, Equations 1 to 7 may contribute to a reduction of geometric aberrations, and Equation 8 may contribute to a compensation of chromatic aberrations.

Figure 1B:
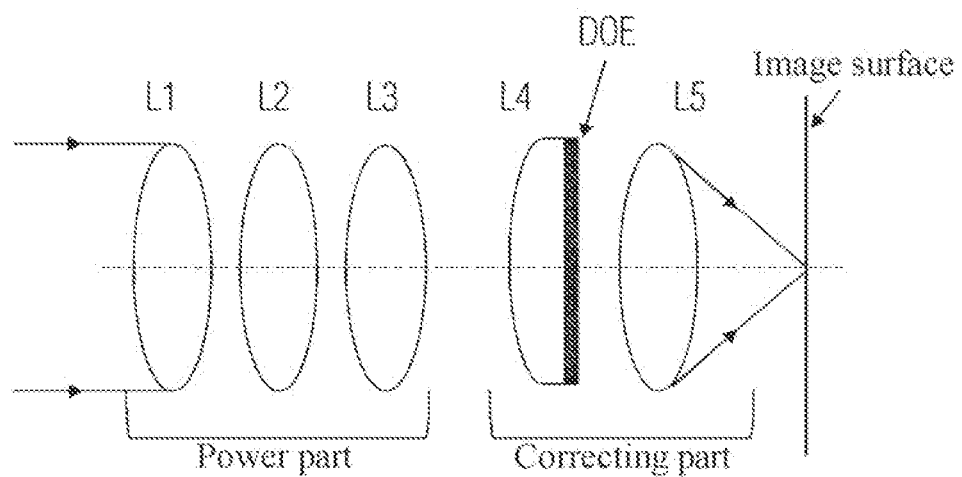
FIG. 1B is a diagram schematically illustrating a wide-field imaging lens with a diffractive optical element (DOE) according to an example embodiment.

Also, a structure of a wide-field imaging lens including five components according to the present disclosure is shown in FIG. 1B.

FIG. 1B is a diagram schematically illustrating a wide-field imaging lens with a diffractive optical element (DOE) according to an example embodiment.

Each of the five components may be configured in a form of a single lens, a DOE, or a combined component including a lens element with a diffractive structure applied to all one optical surface and both optical surfaces.

In an example of the combined component, an equivalent Abbe number may be determined by Equation 9 shown below.

$$v \rightarrow v_{i\,eq} \cdot v_{i\,eq} = \frac{\varphi_{i\,eq}}{\frac{\varphi_i}{v_i} + \frac{\varphi DOE}{vDOE}} \quad \text{[Equation 9]}$$

In Equation 9, i denotes a number of a lens element, $v_i$ denotes an Abbe number of an i-th lens element, vDOE denotes an Abbe number of a DOE, φi denotes an optical (refractive) power of the i-th lens element, φDOE denotes optical power of the DOE, φi eq denotes equivalent optical power corresponding to the i-th lens element and the DOE, and vi eq denotes an equivalent Abbe number corresponding to the i-th lens element and the DOE.

In addition to Equations 1 to 9 provided above, Equation 10 for a compact wide-field imaging lens according to the present disclosure is obtained through experimental studies may be obtained as shown below.

$$LT\ min \geq 0.3\ mm \quad \text{[Equation 10]}$$

In Equation 10, LT min denotes a minimum value of a thickness of each of the first lens element L1 to the fifth lens elements L5.

Equation 10 may provide an optimal condition for manufacturing and arrangement of lens elements in an imaging lens.

Figure 2A:
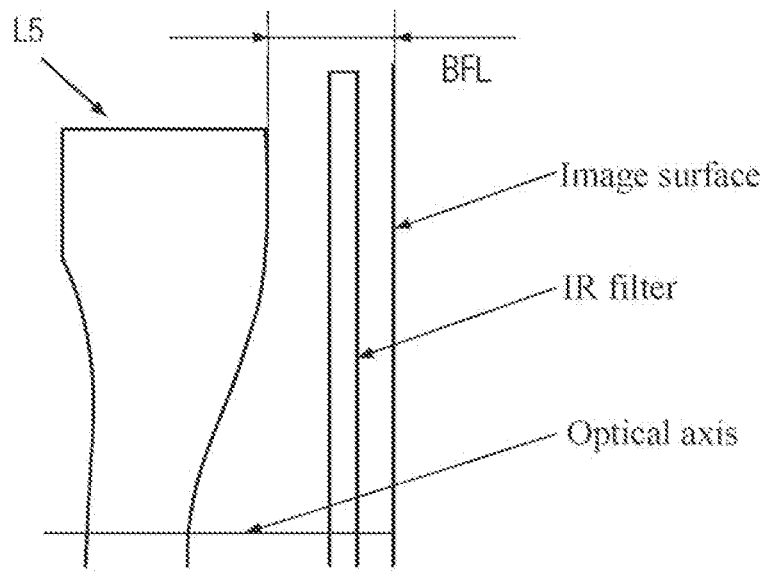
FIG. 2A is a diagram schematically illustrating a portion of a wide-field imaging lens according to an example embodiment and a back segment (BFL) of a focal length measured from an image-side surface of a lens element L5 to an image surface.

FIG. 2A is a diagram schematically illustrating a portion of a wide-field imaging lens according to an example embodiment and a back segment BFL of a focal length measured from an image-side surface of a lens element L5 to an image surface.

In this case, Equation 11 below may be satisfied in the wide-field imaging lens.

$$0.32 < \frac{BFL}{f} < 0.33 \quad \text{[Equation 11]}$$

In Equation 11, BFL denotes a back segment of a focal length measured from the image-side surface of the lens element L5 to the image surface, without consideration for an infrared (IR) filter.

Equation 11 may provide optimal conditions for mechanical docking of a lens and a sensor (for example, an image receiver) and for a placement of an autofocusing means.

Figure 2B:
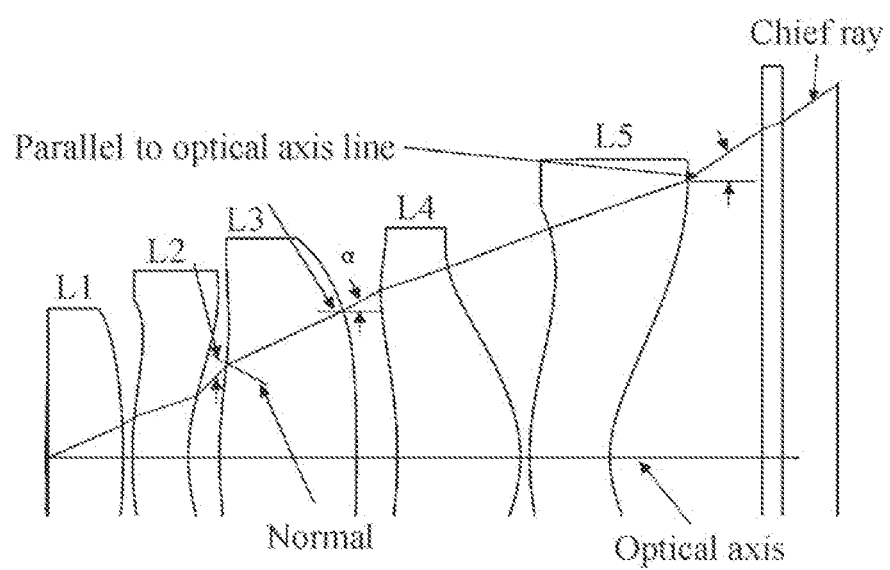
FIG. 2B is a diagram schematically illustrating transmission of rays through lens elements L1 to L5 according to an example embodiment.

FIG. 2B is a diagram schematically illustrating transmission of rays through lens elements L1 to L5 according to an example embodiment.

$$0.6684 < ZCRC < 0.964 \quad \text{[Equation 12]}$$

In Equation 12, ZCRC denotes a Z direction cosine of a ray for an angle α between an optical axis and a chief ray after refraction at an optical surface (see FIG. 2B).

$$3.12° < ICRA < 58.71° \quad \text{[Equation 13]}$$

In Equation 13, ICRA denotes an angle of incidence of the chief ray on the optical surface (see FIG. 2B).

$$1.545 < n < 1.743 \quad \text{[Equation 14]}$$

In Equation 14, n denotes a refractive index of each of five lens elements.

In this case, in compliance with Equations 12 to 14, a high relative illumination in a lens may be maintained, and correction of geometric aberrations may be simplified.

$$23.8° < CRA < 33.79° \quad \text{[Equation 15]}$$

In Equation 15, CRA denotes an angle between the chief ray and the optical axis.

Thus, it may be found based on Equations 12 and 15 that then the smaller the angle CRA, the more uniform distribution of an image plane illumination (see FIG. 2B).

Figure 2C:
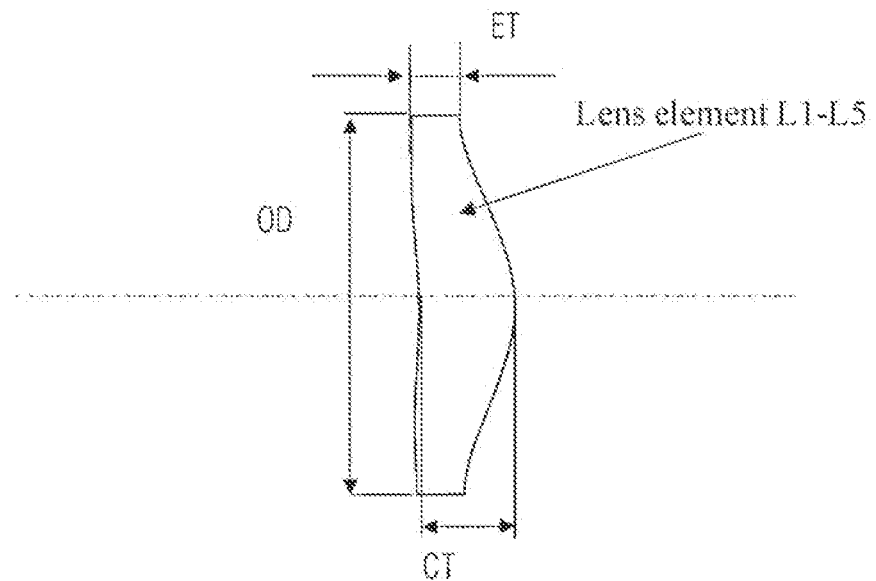
FIG. 2C is a diagram schematically illustrating dimensions of lens elements L1 to L5 according to an example embodiment.

FIG. 2C is a diagram schematically illustrating dimensions of lens elements L1 to L5 according to an example embodiment.

$$1.19 < \frac{OD}{CT} < 4.14 \quad \text{[Equation 16]}$$

$$2.02 < \frac{OD}{ET} < 3.91$$

In Equation 16, OD denotes a diameter of a lens element, CT denotes an axial thickness of a lens element, and ET denotes a minimum thickness of a lens element (see FIG. 2C).

Equation 16 is applied to each of the lens elements L1 to L5. If Equation 16 is satisfied, manufacturing of the lens elements L1 to L5 may be simplified.

Figure 2D:
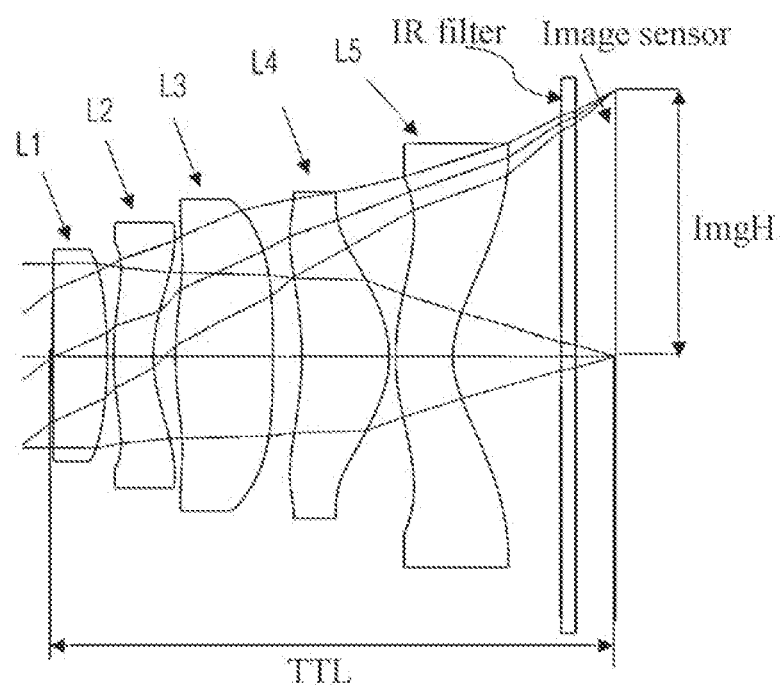
FIG. 2D is a diagram schematically illustrating transmission of rays through lens elements L1 to L5 to a sensor according to an example embodiment.

FIG. 2D is a diagram schematically illustrating transmission of rays through lens elements L1 to L5 to a sensor according to an example embodiment.

$$2.02 < \frac{TTL}{ImgH} < 2.13 \quad \text{[Equation 17]}$$

In Equation 17, TTL denotes an axial distance between an object-side surface of a first lens element L1 and an image surface, that is, a total length of an imaging lens, and ImgH denotes one-half of a diagonal length of a resulting image (see FIG. 2D).

Satisfaction of Equation 17 may contribute to compactness of a lens while maintaining a low F-number, thereby obtaining a high resolution of a formed image.

In this case, aspheric surface profiles of lens elements of a wide-field imaging lens according to an example embodiment may be represented by Equation 18 as shown below.

$$z = \frac{cr^2}{1 + \sqrt{1-(1+k)c^2r^2}} + A_2r^2 + A_4r^4 + A_6r^6 + A_8r^8 + A_{10}r^{10} + A_{12}r^{12} + A_{14}r^{14} + A_{16}r^{16} \quad \text{[Equation 18]}$$

In Equation 18, z denotes displacement in parallel with an optical axis between a profile point on the image surface and an axial vertex of the image surface on the optical axis, r denotes a radial distance from the optical axis, k denotes a conic coefficient of the image surface, c denotes a curvature radius of the image surface at a profile point, and Ai denotes an i-th order aspherical coefficient of the image surface.

A complex shape of surfaces of lens elements L1 to L5 shown in FIGS. 1A to 5 may provide correction of a field curvature and enhance a quality of an image formed by a wide-field imaging lens according to an example embodiment.

At the same time, lens elements L1 to L5 that are made of optical plastic and that have aspheric surfaces according to the present disclosure may be easily formed, which may lead to a decrease in costs.

In manufacturing of lens elements L1 to L5 that are made of optical glass and that have aspheric surfaces, the order of the aspheric surfaces may be selected due to a relatively high refractive index of the optical glass and a relatively low Abbe number, which may also lead to a decrease in costs for manufacturing lenses according to the present disclosure and electronic devices using the lenses.

According to an aspect of the present disclosure, characteristics of the wide-field imaging lens match characteristics of an optical receiver (for example, a sensor). In particular, a resolution of a lens may need to be matched to a pixel size of a selected sensor. To match the above parameters, a radius of a scattering diffraction spot may need to be equal to one pixel, as shown in Equation 19 below.

$$r = 2 * \text{pix} \quad \text{[Equation 19]}$$

In Equation 19, r denotes a radius of a scattering diffraction spot, and pix denotes a pixel size.

A radius of a diffraction spot provided by a lens may be represented as shown in Equation 20 below.

$$r = 1.22 \lambda \text{Fno} \quad \text{[Equation 20]}$$

In Equation 20, Fno denotes an F-number of a lens, and λ denotes a wavelength of a spectral range that is taken into consideration.

If a pixel size is 0.8 μm and if parameters of the wide-field imaging lens and a receiver (for example, a sensor) need to be matched according to a selected spectral range (for example, a range of 0.44 to 0.70 μm), the wide-field imaging lens may need to have the following values of the F-number Fno:

λ=0.44 μm, Fno=2.98;
λ=0.486 μm, Fno=2.70;
λ=0.588 μm, Fno=2.23;
λ=0.656 μm, Fno=2.00; and
λ=0.700 μm, Fno=1.87.

Thus, a maximum value of the F-number Fno may need to be 1.87.

In this case, a resolution characterized by a frequency-contrast characteristic may need to be taken into consideration at one-half of a Nyquist frequency, as shown in Equation 21 below.

$$v=1000/(2*\text{pix}) \quad \text{[Equation 21]}$$

In Equation 21, v denotes the Nyquist frequency.

In other words, a frequency v/2 of 313 lines per millimeter (lines/mm) may be taken into consideration.

The present disclosure provides an optical image capturing device in which a wide-field imaging lens is obtained for a pixel size d of 0.8 µm with a contrast of 0.3 or greater at a spatial frequency v of 313 lines/mm.

All of Equations 1 to 21 described above may be satisfied for each example of a wide-field imaging lens and an optical image capturing device including the wide-field imaging lens.

Hereinafter, predetermined examples of a wide-field imaging lens and an optical image capturing device according to the present disclosure will be provided.

ONE EXAMPLE

According to the present disclosure, a wide-field imaging lens and an optical image capturing device including the wide-field imaging lens and an image sensor 170 are described with reference to FIG. 3.

Figure 3:
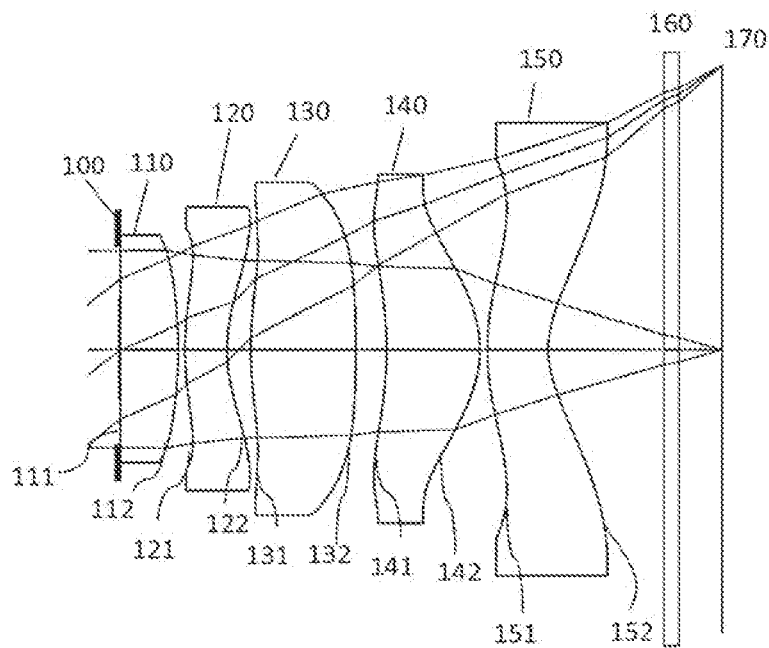
FIG. 3 is a diagram schematically illustrating an example of an optical image capturing device including a wide-field imaging lens according to an example embodiment.

FIG. 3 is a diagram schematically illustrating an example of an optical image capturing device including a wide-field imaging lens according to an example embodiment.

Referring to FIG. 3, the wide-field imaging lens includes five lens elements arranged sequentially along an optical axis of the optical image capturing device from an object side to an image surface (that coincides with the image sensor 170) formed by the wide-field imaging lens. The five lens elements may include, for example, a first lens element 110, a second lens element 120, a third lens element 130, a fourth lens element 140, and a fifth lens element 150.

The first lens element 110 may have positive refractive power, an object-side surface 111 of the first lens element 110 may be convex in a paraxial region of the object-side surface 111, and an image-side surface 112 of the first lens element 110 may be convex in a paraxial region of the image-side surface 112. The object-side surface 111 and the image-side surface 112 of the first lens element 110 may be aspheric surfaces.

The second lens element 120 may have negative refractive power, an object-side surface 121 of the second lens element 120 may be convex in a paraxial region of the object-side surface 121, and an image-side surface 122 of the second lens element 120 may be concave in a paraxial region of the image-side surface 122. The object-side surface 121 and the image-side surface 122 of the second lens element 120 may be aspheric surfaces.

The third lens element 130 may have positive refractive power, an object-side surface 131 of the third lens element 130 may be convex in a paraxial region of the object-side surface 131, and an image-side surface 132 of the third lens element 130 may be convex in a paraxial region of the image-side surface 132. The object-side surface 131 and the image-side surface 132 of the third lens element 130 may be aspheric surfaces.

The fourth lens element 140 may have positive refractive power, an object-side surface 141 of the fourth lens element 140 may be concave in a paraxial region of the object-side surface 141, and an image-side surface 142 of the fourth lens element 140 may be convex in a paraxial region of the image-side surface 142. The object-side surface 141 and the image-side surface 142 of the fourth lens element 140 may be aspheric surfaces. The fourth lens element 140 may be formed of a plastic material.

The fifth lens element 150 may have negative refractive power, an object-side surface 151 of the fifth lens element 150 may be convex in a paraxial region of the object-side surface 151, and an image-side surface 152 of the fifth lens element 150 may be concave in a paraxial region of the image-side surface 152. The object-side surface 151 and the image-side surface 152 of the fifth lens element 150 may be aspheric surfaces.

Each of the first lens element 110 to the fifth lens element 150 may be formed of optical plastic.

Table 1 shows a ratio of design parameters of the wide-field imaging lens of FIG. 3.

TABLE 1

| | | | |
|---|---|---|---|
| $(f_1/f) \cdot (1/n_1)$ | 1.22 | $LT_{min}$ | 0.300 |
| $(f_2/f) \cdot (1/n_2)$ | −0.94 | FBL/f | 0.32 |
| $(f_3/f) \cdot (1/n_3)$ | 1.00 | OD/CT | 1.40 ÷ 3.12 |
| $(f_1/f) \cdot (1/v_1)$ | 0.034 | OD/ET | 1.71 ÷ 3.67 |
| $(f_2/f) \cdot (1/v_2)$ | −0.06 | ZCRC | 0.69 ÷ 0.95 |
| $(f_3/f) \cdot (1/v_3)$ | 0.027 | ICRA | 4.9 ÷ 51.9 |
| $|v_4 - v_5|$ | 31.96 | n | 1.517 ÷ 1.64 |
| OT/TTL | 0.34 | CRA | 33.79 |
| | | TTL/ImgH | 2.13 |

Predetermined values of a relationship between parameters of the wide-field imaging lens of FIG. 3 are provided in Table 1, and Equations 1 to 8 below may be satisfied.

$$1.19 < (f1/f) \cdot (1/n1) < 1.35 \quad \text{[Equation 1]}$$

$$-1.71 < (f2/f) \cdot (1/n2) < -0.94 \quad \text{[Equation 2]}$$

$$0.48 < (f3/f) \cdot (1/n3) < 1.00 \quad \text{[Equation 3]}$$

$$0.033 < \left(\frac{f1}{f}\right) \cdot \left(\frac{1}{v1}\right) < 0.048 \quad \text{[Equation 4]}$$

$$-0.110 < (f2/f) \cdot (1/v3) < -0.060 \quad \text{[Equation 5]}$$

$$0.013 < (f3/f) \cdot (1/v3) < 0.027 \quad \text{[Equation 6]}$$

$$0.34 < \text{OT/TTL} < 0.5 \quad \text{[Equation 7]}$$

$$|v_4 - v_5| > 18.0 \quad \text{[Equation 8]}$$

In Equations 1 to 8, f denotes a focal length of the wide-field imaging lens, $f_1$ denotes a focal length of the first lens element, $f_2$ denotes a focal length of the second lens element, $f_3$ denotes a focal length of the third lens element, $n_1$ denotes a refractive index of the first lens element, $n_2$ denotes a refractive index of the second lens element, $n_3$ denotes a refractive index of the third lens element, $v_1$ denotes an Abbe number of the first lens element, $v_2$ denotes an Abbe number of the second lens element, $v_3$ denotes an Abbe number of the third lens element, $v_4$ denotes an Abbe number of the fourth lens element, $v_5$ denotes an Abbe number of the fifth lens element, OT denotes an overall thickness of the first lens element 110, the second lens element 120 and the third lens element 130, and TTL denotes an axial distance between the object-side surface of the first lens element and the image surface, that is, a total length of the wide-field imaging lens.

In this example, a DOE (see FIG. 1B) may be applied to at least one surface of at least one of the second lens element 120 to the fifth lens element 150, which may significantly contribute to elimination of chromatic aberrations and geometric aberrations. The DOE may have a relief-phase annular microstructure on a flat or curved surface with a pitch comparable to a wavelength of radiation.

A frequency-contrast characteristic may be measuring of a resolution of a lens. The wide-field imaging lens of FIG. 3 may have frequency-contrast characteristics that a module of an optical transfer function (OTF), referred to as a modulation transfer function (MTF), is greater than 0.3 at a spatial frequency SF of 313 lines/mm and the MTF is greater than 0.42 at a spatial frequency SF of 200 lines/mm.

In this example, the total length TTL of the wide-field imaging lens may be 4.26 mm and an F-number may be 1.76.

Figure 6:
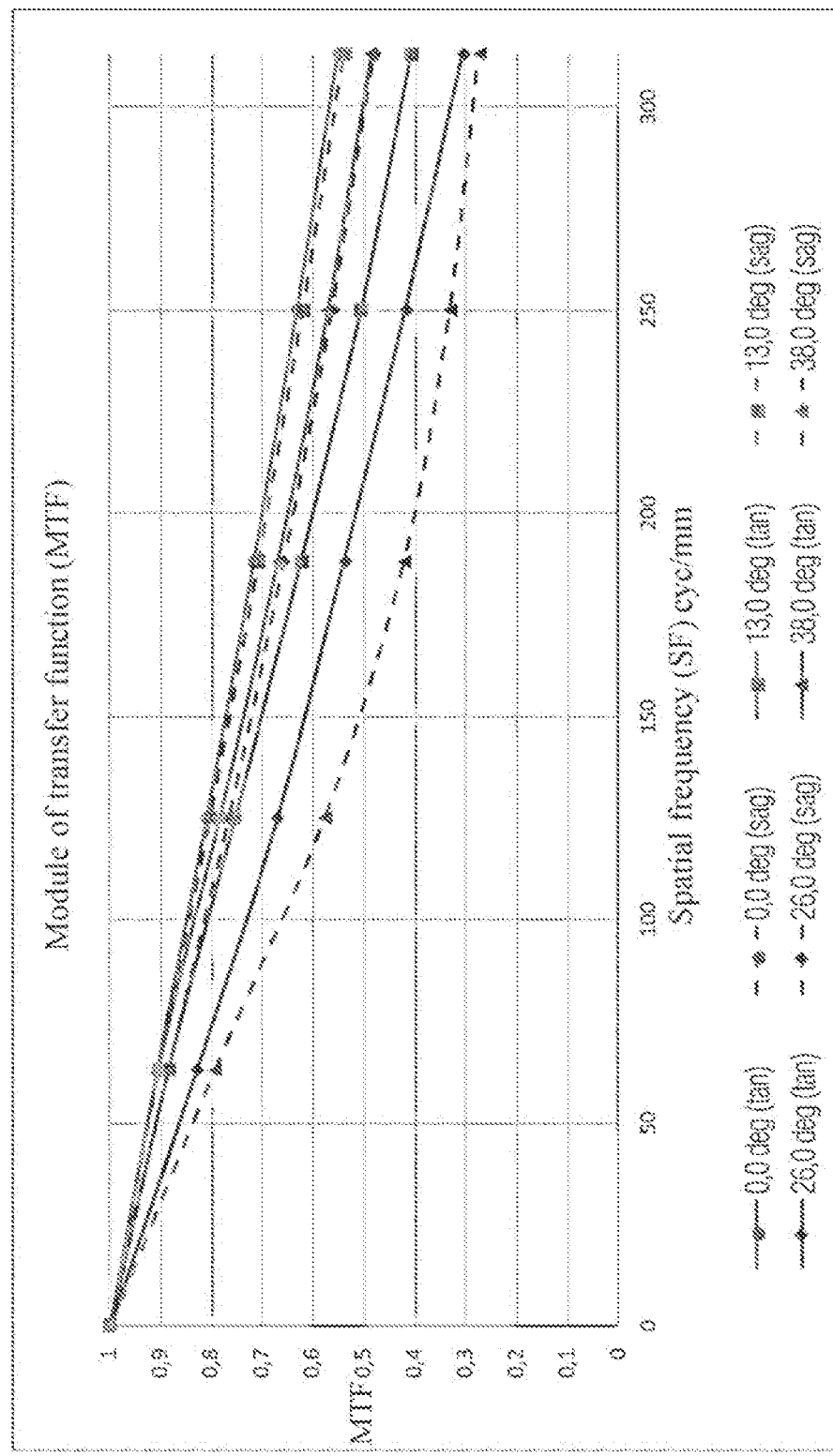
FIG. 6 is a graph illustrating an example of characteristics of a modulation transfer function (MTF) for different field points of a wide-field imaging lens according to an example embodiment.

FIG. 6 is a graph illustrating an example of characteristics of an MTF for different field points of a wide-field imaging lens according to an example embodiment.

The graph of FIG. 6 shows frequency-contrast characteristics of the wide-field imaging lens for various field points (for example, 0.0°, 13.0°, 26.0°, and 38.0°) depending on a spatial frequency SF. In other words, FIG. 6 shows a contrast in which different frequencies are resolved. A maximum frequency is 313 lines/mm and the contrast (MTF) of all field points exceeds 0.3.

In the graph of FIG. 6, an abscissa axis represents a spatial frequency in lines/mm, and an ordinate axis represents the MTF, which indicates a contrast of an image.

Curves of FIG. 6 represent MTF for different field points (for example, 0.0°, 13.0°, 26.0°, and 38.0°) for two sections, that is, a tangential plane (YZ) and a sagittal plane (XZ).

Figure 7:
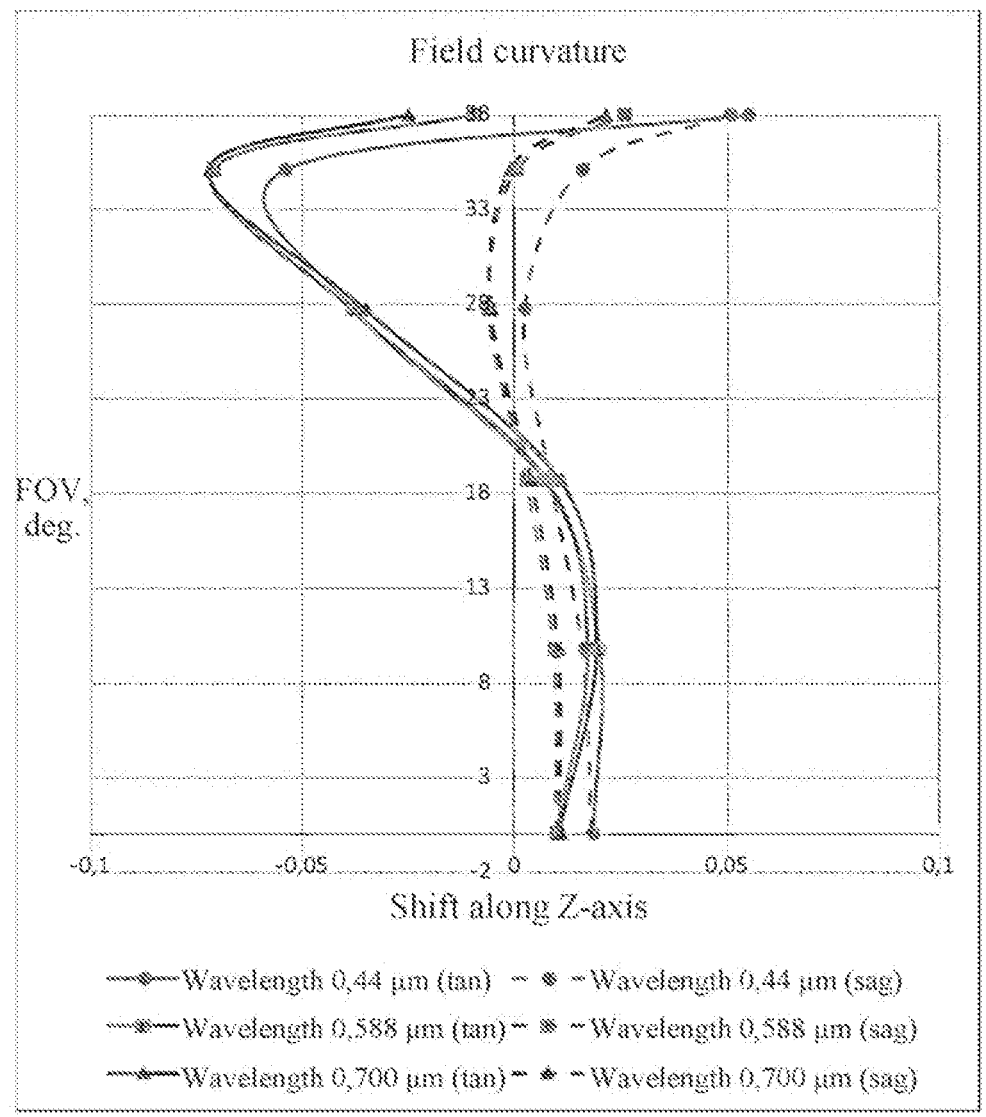
FIG. 7 is a graph illustrating an example of a field curvature of a wide-field imaging lens according to an example embodiment.

FIG. 7 is a graph illustrating an example of a field curvature of a wide-field imaging lens according to an example embodiment.

A curvature of a field of view (FOV) of the wide-field imaging lens may be represented for wavelengths, for example, 0.440 μm, 0.588 μm, and 0.700 μm. In FIG. 7, a direction of the tangential plane is indicated by a solid line, and a direction of the sagittal plane is indicated by a dotted line.

In the graph of FIG. 7, an abscissa axis represents values of the field curvature, that is, a shift along a Z-axis is in mm, and an ordinate axis represents the FOV of the wide-field imaging lens in degrees.

Figure 8:
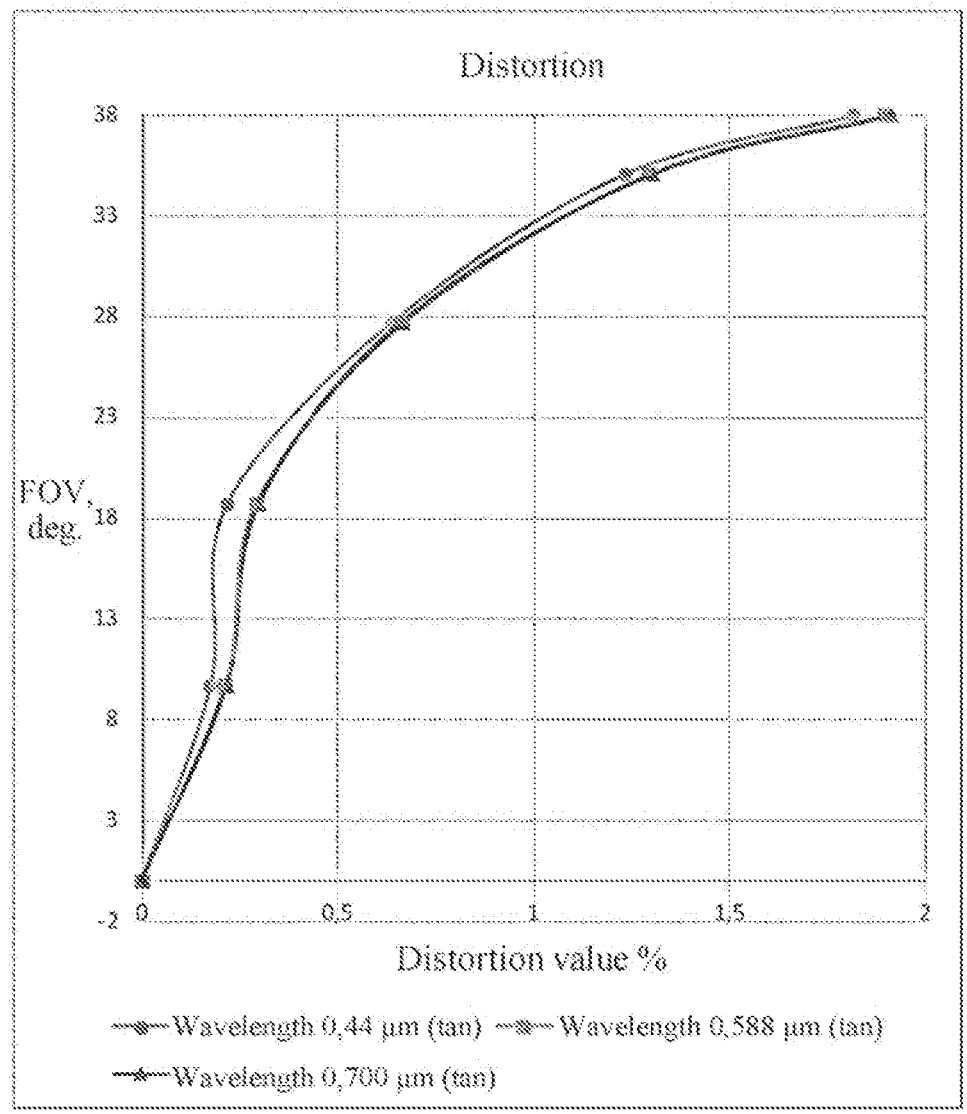
FIG. 8 is a graph illustrating an example of distortion of a wide-field imaging lens according to an example embodiment.

FIG. 8 is a graph illustrating an example of distortion of a wide-field imaging lens according to an example embodiment.

In the graph of FIG. 8, an abscissa axis represents a distortion value as a percentage, and an ordinate axis represents a FOV of the wide-field imaging lens in degrees. In this example, distortion curves are represented for wavelengths, for example, 0.440 μm, 0.588 μm, and 0.700 μm. Also, the distortion of the wide-field imaging lens does not exceed 2%.

Figure 9:
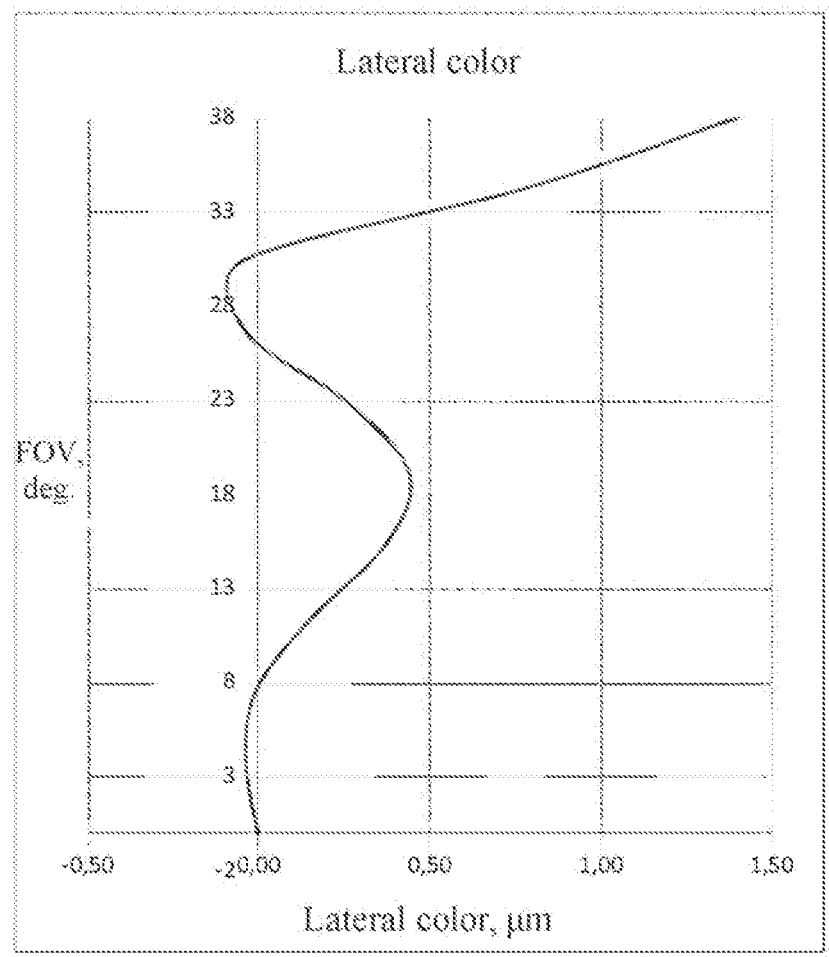
FIG. 9 is a graph illustrating an example of a lateral color of a wide-field imaging lens according to an example embodiment.

FIG. 9 is a graph illustrating an example of a lateral color of a wide-field imaging lens according to an example embodiment. In the graph of FIG. 9, an abscissa axis represents a lateral color value in μm, and an ordinate axis represents a FOV in degrees. In this example, a maximum spread, that is, a difference between a minimum value and a maximum value of the lateral color represented on the abscissa axis, may be 1.57 μm. An indicated chromatic aberration may be taken into consideration for a short wavelength of 0.440 μm and a long wavelength of 0.700 μm, and a maximum image shift for indicated wavelengths may be less than 1.6 μm.

Also, the optical image capturing device of FIG. 3 may further include an aperture stop 100 located at the first lens element 110 on an object side, and a filter 160 located between the fifth lens element 150 and the image surface. All of the above components of the optical image capturing device may be optically coupled to each other so that an image may be formed on a working surface of the image sensor 170.

The image sensor 170 may be a photodetector array that may detect electromagnetic radiation in a range of 0.4 to 0.7 μm, and a size of a sensor pixel may range from 0.7 μm to 1 μm.

The filter 160 may be formed of optical glass, and may be an IR filter designed to cancel noise occurring when IR radiation is recorded in a range of 0.8 to 14.0 μm. Design parameters of the wide-field imaging lens of FIG. 3 are shown in Table 2 below.

Table 2 shows the design parameters of the wide-field imaging lens.

TABLE 2

| F = 2.51 mm, Fno = 1.76, HFOV = 38deg |||||||
|---|---|---|---|---|---|---|
| Surface | | Curvature Radius | Thickness | Index | Abbe | Focal lens |
| 0 | Object | Plano | Inf | | | |
| 1 | Ape. Stop | Plano | −9.123e−03 | | | |
| 2 | Lens1 | 13.899 | 0.417 | 1.545 | 55.93 | 4.72 |
| 3 | | −3.122 | 0.048 | | | |
| 4 | Lens2 | 2.037 | 0.300 | 1.640 | 25.53 | −3.86 |
| 5 | | 1.052 | 0.168 | | | |
| 6 | Lens3 | 2.385 | 0.739 | 1.545 | 55.93 | 3.86 |
| 7 | | −15.983 | 0.219 | | | |
| 8 | Lens4 | −2.571 | 0.661 | 1.545 | 55.93 | 1.71 |
| 9 | | −0.747 | 0.048 | | | |
| 10 | Lens5 | 1.608 | 0.431 | 1.636 | 23.97 | −2.08 |
| 11 | | 0.649 | 0.820 | | | |
| 12 | Filter | Plano | 0.11 | 1.517 | 64.20 | |
| 13 | | Plano | 0.3 | | | |
| 14 | Image | Plano | | | | |

The design parameters of Table 2 may include the following parameters:

F-number Fno=1.76;

A focal length of the wide-field imaging lens=2.51 mm; and

Half of a maximum field of view HFOV=38°.

Also, in Table 2, a radius of a curvature, a thickness, and a focal length are represented in mm.

Numbering of surfaces of lens elements from 1 to 14 in Table 2 may indicate the surfaces in an order from an object to an image. In this case, referring to FIG. 3, Lenses 1 to 5 shown in Table 2 represent the first lens element 110 to the fifth lens element 150, respectively.

Also, in Table 2, in a column thickness relative to positions L1 to L5, two values are represented. A first value may indicate a thickness of a lens element itself, and a second value may indicate a distance to a next lens element.

Table 3 shows aspheric coefficient values of surfaces of the wide-field imaging lens of FIG. 3.

TABLE 3

| Surface # | 2 | 3 | 4 | 5 | 6 |
|---|---|---|---|---|---|
| k= | −1000 | −12.1837 | 4.1093 | −6.6654 | −8.7159 |
| A2= | 0 | 0 | 0 | 0 | 0 |
| A4= | 6.2783E−002 | 4.8012E−002 | −3.7127E−001 | −5.9313E−002 | −2.1985E−001 |
| A6= | −1.8829E−001 | −2.1951E−001 | 2.3689E−001 | 4.7489E−002 | 3.2653E−001 |
| A8= | 2.6886E−001 | −1.5985E−001 | −6.1864E−001 | −3.7619E−001 | −7.0086E−001 |
| A10= | −5.9394E−001 | 3.9435E−001 | −1.6241E−001 | 2.7719E−001 | 3.8180E−001 |
| A12= | 5.0925E−001 | −2.8561E−001 | 9.9785E−001 | 1.7441E−001 | 6.5082E−001 |
| A14= | 3.1696E−001 | 2.2614E−001 | −7.0288E−001 | −2.6501E−001 | −8.0826E−001 |
| A16= | −7.2147E−001 | −3.4762E−001 | −2.9679E−001 | 8.2874E−002 | 2.4278E−001 |

| Surface # | 7 | 8 | 9 | 10 | 11 |
|---|---|---|---|---|---|
| k= | 144.0256 | 2.5682 | −3.6062 | −5.3030 | −4.1422 |
| A2= | 0 | 0 | 0 | 0 | 0 |
| A4= | −1.2644E−001 | 1.0996E−001 | −1.1304E−001 | −8.8540E−002 | −6.1930E−002 |
| A6= | 9.7946E−003 | −4.8356E−002 | 9.3071E−002 | −3.4784E−002 | −1.1321E−002 |
| A8= | −4.4691E−002 | 1.60366E−001 | 3.3318E−002 | 4.2089E−002 | 2.6973E−002 |
| A10= | 4.0122E−002 | −1.8876E−002 | −9.6890E−003 | −1.1689E−002 | −1.8368E−002 |
| A12= | 8.2771E−003 | −1.2348E−001 | 5.5340E−002 | −1.3645E−002 | 6.7464E−003 |
| A14= | −1.8617E−002 | 9.0242E−002 | −6.6785E−002 | 1.1041E−002 | −1.2739E−003 |
| A16= | 2.9867E−003 | −2.1497E−002 | 1.8646E−002 | −2.2954E−003 | 9.4602E−005 |

Table 3 shows the aspheric coefficient values of the surfaces of the wide-field imaging lens in an order of locations from an object to an image. In Table 3, surface #2 may correspond to the object-side surface 111 of the first lens element 110. Also, Table 3 shows values of A2 to A16 aspheric coefficients of 2nd to 16th orders that are k-conical coefficients of surfaces of lens elements.

In this example, profiles of aspheric surfaces of the first lens element 110 to the fifth lens element 150 of the wide-field imaging lens will be described by Equation 18.

If aspheric surfaces are used, field aberrations may be corrected with a small number of lens elements (in this example, five lens elements), which may ensure compactness of an optical scheme.

Design and parameters of the wide-field imaging lens and the optical image capturing device according to the example embodiment may provide a high image resolution. In other words, the contrast (MTF) of all the field points may exceed 0.3 at a spatial frequency of 313 lines/mm, a sensor pixel size may be equal to d of 0.8 μm at TTL of 4.26 mm, and the F-number of the wide-field imaging lens may be equal to 1.76.

ANOTHER EXAMPLE

Hereinafter, a wide-field imaging lens and an optical image capturing device including the wide-field imaging lens and an image sensor 270 are described with reference to FIG. 4.

Figure 4:
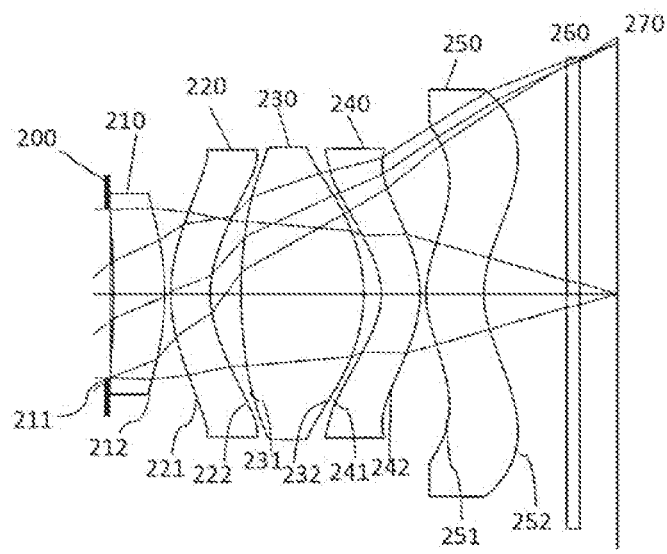
FIG. 4 is a diagram schematically illustrating another example of an optical image capturing device including a wide-field imaging lens according to an example embodiment.

FIG. 4 is a diagram schematically illustrating another example of an optical image capturing device including a wide-field imaging lens according to an example embodiment.

Referring to FIG. 4, the wide-field imaging lens includes five lens elements arranged sequentially along an optical axis of the optical image capturing device from an object side to an image surface (that coincides with the image sensor 270) formed by the wide-field imaging lens. The five lens elements may include, for example, a first lens element 210, a second lens element 220, a third lens element 230, a fourth lens element 240, and a fifth lens element 250.

The first lens element 210 may have positive refractive power, an object-side surface 211 of the first lens element 210 may be concave in a paraxial region of the object-side surface 211, and an image-side surface 212 of the first lens element 210 may be convex in a paraxial region of the image-side surface 212. The object-side surface 211 and the image-side surface 212 of the first lens element 210 may be aspheric surfaces.

The second lens element 220 may have negative refractive power, an object-side surface 221 of the second lens element 220 may be convex in a paraxial region of the object-side surface 221, and an image-side surface 222 of the second lens element 220 may be concave in a paraxial region of the image-side surface 222. The object-side surface 221 and the image-side surface 222 of the second lens element 220 may be aspheric surfaces.

The third lens element 230 may have positive refractive power, an object-side surface 231 of the third lens element 230 may be convex in a paraxial region of the object-side surface 231, and an image-side surface 232 of the third lens element 230 may be convex in a paraxial region of the image-side surface 232. The object-side surface 231 and the image-side surface 232 of the third lens element 230 may be aspheric surfaces.

The fourth lens element 240 may have negative refractive power, an object-side surface 241 of the fourth lens element 240 may be concave in a paraxial region of the object-side surface 241, and an image-side surface 242 of the fourth lens element 240 may be convex in a paraxial region of the image-side surface 242. The object-side surface 241 and the image-side surface 242 of the fourth lens element 240 may be aspheric surfaces.

The fifth lens element 250 may have positive refractive power, an object-side surface 251 of the fifth lens element 250 may be convex in a paraxial region of the object-side surface 251, and an image-side surface 252 of the fifth lens element 250 may be concave in a paraxial region of the image-side surface 252. The object-side surface 251 and the image-side surface 252 of the fifth lens element 250 may be aspheric surfaces.

Each of the first lens element 210 to the fifth lens element 250 may be formed of optical plastic.

Table 4 shows a ratio of design parameters of the wide-field imaging lens of FIG. 4.

TABLE 4

| | | | |
|---|---|---|---|
| $(f_1/f) \cdot (1/n_1)$ | 1.19 | $LT_{min}$ | 0.309 mm |
| $(f_2/f) \cdot (1/n_2)$ | −1.71 | FBL/f | 0.33 |
| $(f_3/f) \cdot (1/n_3)$ | 0.48 | OD/CT | (1.19 ÷ 3.74) |
| $(f_1/f) \cdot (1/v_1)$ | 0.033 | OD/ET | (2.46 ÷ 3.85) |
| $(f_2/f) \cdot (1/v_2)$ | −0.110 | ZCRC | (0.684 ÷ 0.964) |
| $(f_3/f) \cdot (1/v_3)$ | 0.013 | ICRA | (3.312 ÷ 56.74) deg |
| $|v_4 - v_5|$ | 36.68 | n | (1.545 ÷ 1.671) |
| OT/TTL | 0.42 | CRA | 23.80 deg |
| | | TTL/ImgH | 2.03 |

Predetermined values of a relationship between parameters of the wide-field imaging lens are provided in Table 4, and Equations 1 to 8 below may be satisfied.

$$1.19 < (f1/f) \cdot (1/n1) < 1.35 \quad \text{[Equation 1]}$$

$$-1.71 < (f2/f) \cdot (1/n2) < -0.94 \quad \text{[Equation 2]}$$

$$0.48 < (f3/f) \cdot (1/n3) < 1.00 \quad \text{[Equation 3]}$$

$$0.033 < \left(\frac{f1}{f}\right) \cdot \left(\frac{1}{v1}\right) < 0.048 \quad \text{[Equation 4]}$$

$$-0.110 < (f2/f) \cdot (1/v3) < -0.060 \quad \text{[Equation 5]}$$

$$0.013 < (f3/f) \cdot (1/v3) < 0.027 \quad \text{[Equation 6]}$$

$$0.34 < OT/TTL < 0.5 \quad \text{[Equation 7]}$$

$$|v_4 - v_5| > 18.0 \quad \text{[Equation 8]}$$

In Equations 1 to 8, f denotes a focal length of the wide-field imaging lens, $f_1$ denotes a focal length of the first lens element, $f_2$ denotes a focal length of the second lens element, $f_3$ denotes a focal length of the third lens element, $n_1$ denotes a refractive index of the first lens element, $n_2$ denotes a refractive index of the second lens element, $n_3$ denotes a refractive index of the third lens element, $v_1$ denotes an Abbe number of the first lens element, $v_2$ denotes an Abbe number of the second lens element, $v_3$ denotes an Abbe number of the third lens element, $v_4$ denotes an Abbe number of the fourth lens element, $v_5$ denotes an Abbe number of the fifth lens element, OT denotes an overall thickness of the first lens element 210, the second lens element 220 and the third lens element 230, and TTL denotes an axial distance between the object-side surface 211 of the first lens element 210 and the image surface, that is, a total length of the wide-field imaging lens.

In this example, a DOE (see FIG. 1B) may be applied to at least one surface of at least one of the second lens element 220 to the fifth lens element 250, which may significantly contribute to elimination of chromatic aberrations and geometric aberrations. The DOE may have a relief-phase annular microstructure on a flat or curved surface with a pitch comparable to a wavelength of radiation.

Also, the optical image capturing device of FIG. 4 may further include an aperture stop 200 located at the first lens element 210 on an object side, and a filter 260 located between the fifth lens element 250 and the image surface. All of the above components of the optical image capturing device may be optically coupled to each other with a possibility of forming an image on a working surface of the image sensor 270.

The image sensor 270 may be a photodetector array that may detect electromagnetic radiation in a range of 0.4 to 0.7 μm, and a size of a sensor pixel may range from 0.7 μm to 1 μm.

The filter 260 may be formed of optical glass, and may be an IR filter designed to cancel noise occurring when IR radiation is recorded in a range of 0.8 to 14.0 μm.

Table 5 shows design parameters of the wide-field imaging lens of FIG. 4.

TABLE 5 f = 2.43 mm, Fno = 1.82, HFOV = 39 deg.

| Surface | | Curvature Radius | Thickness | Index | Abbe # | Focal lens |
|---|---|---|---|---|---|---|
| 0 | Object | Plano | Inf | | | |
| 1 | Ape.Stop | Plano | 0.027 | | | |
| 2 | Lens 1 | −8.846 | 0.413 | 1.545 | 55.93 | 4.48 |
| 3 | | −1.851 | 0.050 | | | |
| 4 | Lens 2 | 1.306 | 0.317 | 1.640 | 25.53 | −6.81 |
| 5 | | 0.876 | 0.245 | | | |
| 6 | Lens 3 | 2.931 | 0.976 | 1.545 | 55.93 | 1.79 |
| 8 | Lens 4 | −0.577 | 0.309 | 1.671 | 19.25 | −2.79 |
| 9 | | −0.929 | 0.050 | | | |
| 10 | Lens 5 | 0.855 | 0.460 | 1.545 | 55.93 | 5.90. |
| 11 | | 0.785 | 0.663 | | | |
| 12 | Filter | Plano | 0.11 | 1.517 | 64.20 | |
| 13 | | Plano | 0.3 | | | |
| 14 | Image | Plano | | | | |

The design parameters of Table 5 may include the following parameters:

F-number Fno=1.82;

A focal length of the wide-field imaging lens=2.43 mm; and

Half of a maximum field of view HFOV=39°.

Also, in Table 5, a radius of a curvature, a thickness, and a focal length are represented in mm.

Numbering of surfaces of lens elements from 1 to 14 in Table 5 may indicate the surfaces in an order from an object to an image. In this case, referring to FIG. 4, Lenses 1 to 5 shown in Table 5 represent the first lens element 210 to the fifth lens element 250, respectively.

Also, in Table 5, in a column thickness relative to positions L1 to L5, two values are represented. A first value may indicate a thickness of a lens element itself, and a second value may indicate a distance to a next lens element.

Table 6 shows aspheric coefficient values of surfaces of the wide-field imaging lens of FIG. 4. In Table 6, surfaces #2-#11 may correspond to an object-side surface 211 of a first lens element 210, an image-side surface 212 of the first lens element 210, an object-side surface 221 of a second lens element 220, an image-side surface 222 of the second lens element 220, an object-side surface 231 of a third lens element 230, an image-side surface 232 of the third lens element 230, an object-side surface 241 of a fourth lens element 240, an image-side surface 242 of the fourth lens element 240, an object-side surface 251 of a fifth lens element 250, and an image-side surface 252 of the fifth lens element 250, respectively.

TABLE 6

| Surface # | 2 | 3 | 4 | 5 | 6 |
|---|---|---|---|---|---|
| k= | −1.77E+01 | 2.41E+00 | −3.98E−01 | −3.60E+00 | 2.76E+00 |
| A2= | −8.07E−03 | 5.49E−03 | 2.24E−02 | 7.66E−03 | −3.00E−02 |
| A4= | 4.14E−02 | 1.77E−01 | −2.76E−01 | −2.84E−02 | 1.85E−02 |
| A6= | −6.58E−02 | 4.09E−02 | 2.94E−01 | 1.15E−01 | −2.47E−02 |
| A8= | −1.72E−01 | −2.64E−01 | −3.36E−01 | −1.62E−01 | 9.20E−02 |
| A10= | 4.27E−01 | 3.49E−01 | 1.55E−01 | 4.64E−02 | −6.02E−02 |
| A12= | 1.02E−01 | 9.53E−02 | −1.01E−02 | 1.05E−02 | 1.83E−03 |
| A14= | −7.29E−01 | 4.42E−02 | −5.67E−03 | 1.76E−03 | 4.53E−04 |
| A16= | 4.25E−01 | −2.56E−01 | 8.74E−05 | −6.86E−03 | 1.70E−03 |

| Surface # | 7 | 8 | 9 | 10 | 11 |
|---|---|---|---|---|---|
| k= | −9.18E−01 | −4.45E+00 | −3.22E+00 | −6.86E+00 | −3.57E+00 |
| A2= | −4.53E−02 | −7.09E−02 | −5.75E−03 | 7.05E−02 | −1.96E−03 |
| A4= | 1.43E−01 | −5.16E−02 | −1.55E−02 | −2.30E−01 | −1.56E−01 |
| A6= | −3.51E−01 | 5.07E−02 | 1.28E−01 | 7.93E−02 | 5.58E−02 |
| A8= | 3.90E−01 | 1.50E−01 | −6.03E−02 | −4.63E−02 | −2.36E−02 |
| A10= | −1.24E−01 | −9.50E−02 | 2.02E−02 | 1.20E−02 | 3.79E−03 |
| A12= | −1.33E−02 | 4.55E−02 | 6.56E−03 | 6.54E−04 | 1.86E−04 |
| A14= | −1.24E−03 | 4.22E−03 | 3.22E−03 | −7.23E−05 | 1.05E−05 |
| A16= | 5.35E−03 | −4.08E−03 | −3.93E−03 | 2.09E−05 | −3.53E−05 |

Table 6 shows the aspheric coefficient values of the surfaces of the wide-field imaging lens in an order of locations from an object to an image. In Table 6, surface #2 may correspond to the object-side surface 211 of the first lens element 210. At the same time, Table 6 shows values of A2 to A16 aspheric coefficients of 2nd to 16th orders that are k-conical coefficients of surfaces of lens elements.

In this example, profiles of aspheric surfaces of the first lens element 210 to the fifth lens element 250 of the wide-field imaging lens will be described by Equation 18.

If aspheric surfaces are used, field aberrations may be corrected with a small number of lens elements (in this example, five lens elements), which may ensure compactness of an optical scheme.

Table 4 shows a relationship of the design parameters of the wide-field imaging lens of FIG. 4.

In addition, one of important parameters of the wide-field imaging lens may be a frequency-contrast characteristic. The frequency-contrast characteristic may be measuring of a resolution of a lens. The wide-field imaging lens of FIG. 4 may have a frequency-contrast characteristic that an MTF is greater than 0.28 at a spatial frequency SF of 313 lines/mm.

In this example, the total length TTL of the wide-field imaging lens may be 4.06 mm, and an F-number may be 1.8.

Figure 10:
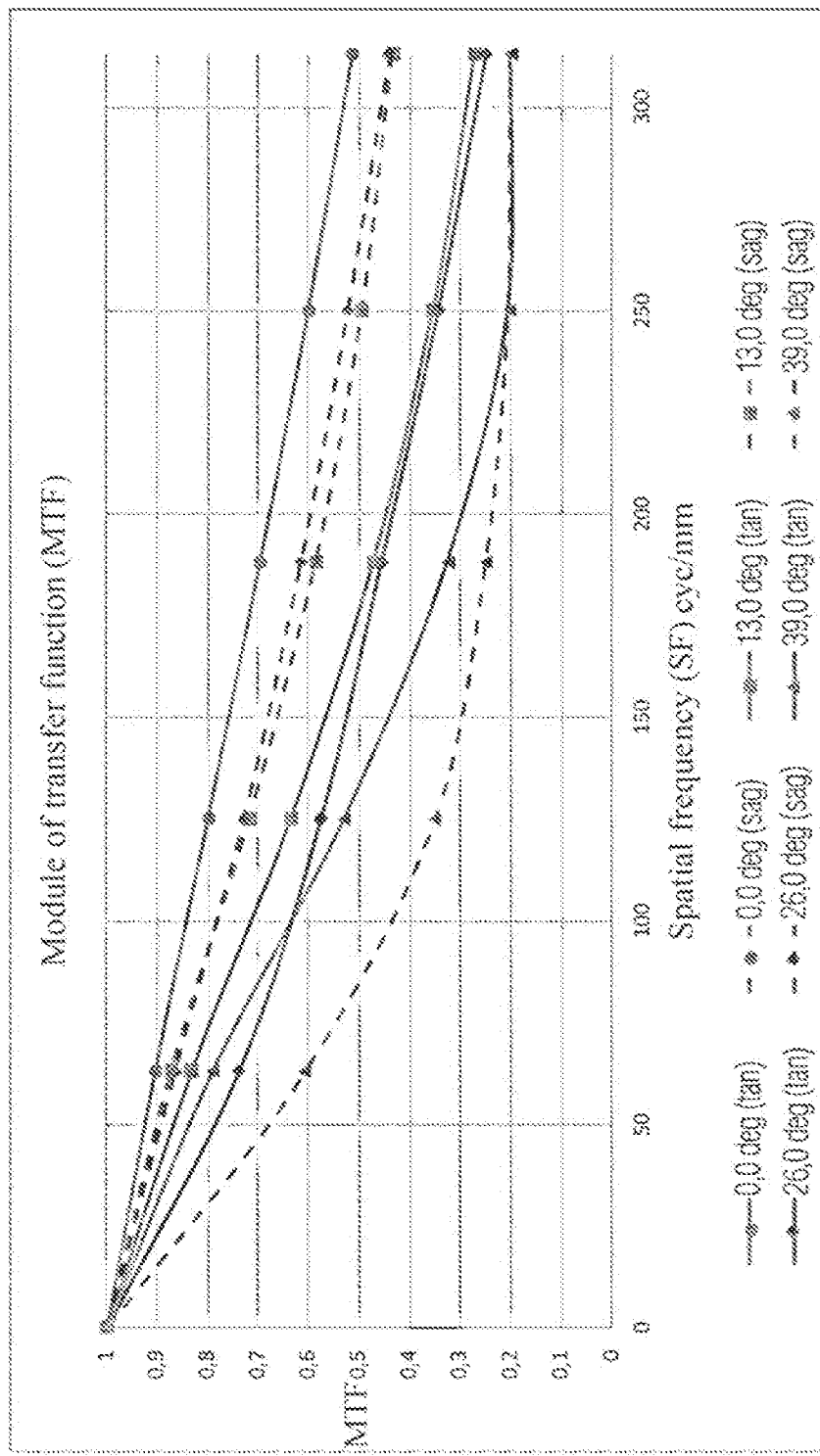
FIG. 10 is a graph illustrating another example of characteristics of an MTF for different field points of a wide-field imaging lens according to an example embodiment.

FIG. 10 is a graph illustrating another example of characteristics of an MTF for different field points of a wide-field imaging lens according to an example embodiment.

The graph of FIG. 10 shows frequency-contrast characteristics of the wide-field imaging lens for various field points (for example, 0.0°, 13.0°, 26.0°, and 38.0°) depending on a spatial frequency SF. In other words, FIG. 10 shows a contrast in which different frequencies are resolved. A maximum frequency is 313 lines/mm and the contrast (MTF) of all field points exceeds 0.28.

In the graph of FIG. 10, an abscissa axis represents a spatial frequency in lines/mm, and an ordinate axis represents the MTF, which indicates a contrast of an image.

Curves of FIG. 10 represent MTF for different field points (for example, 0.0°, 13.0°, 26.0°, and 38.0°) for two sections, that is, a tangential plane (YZ) and a sagittal plane (XZ).

Figure 11:
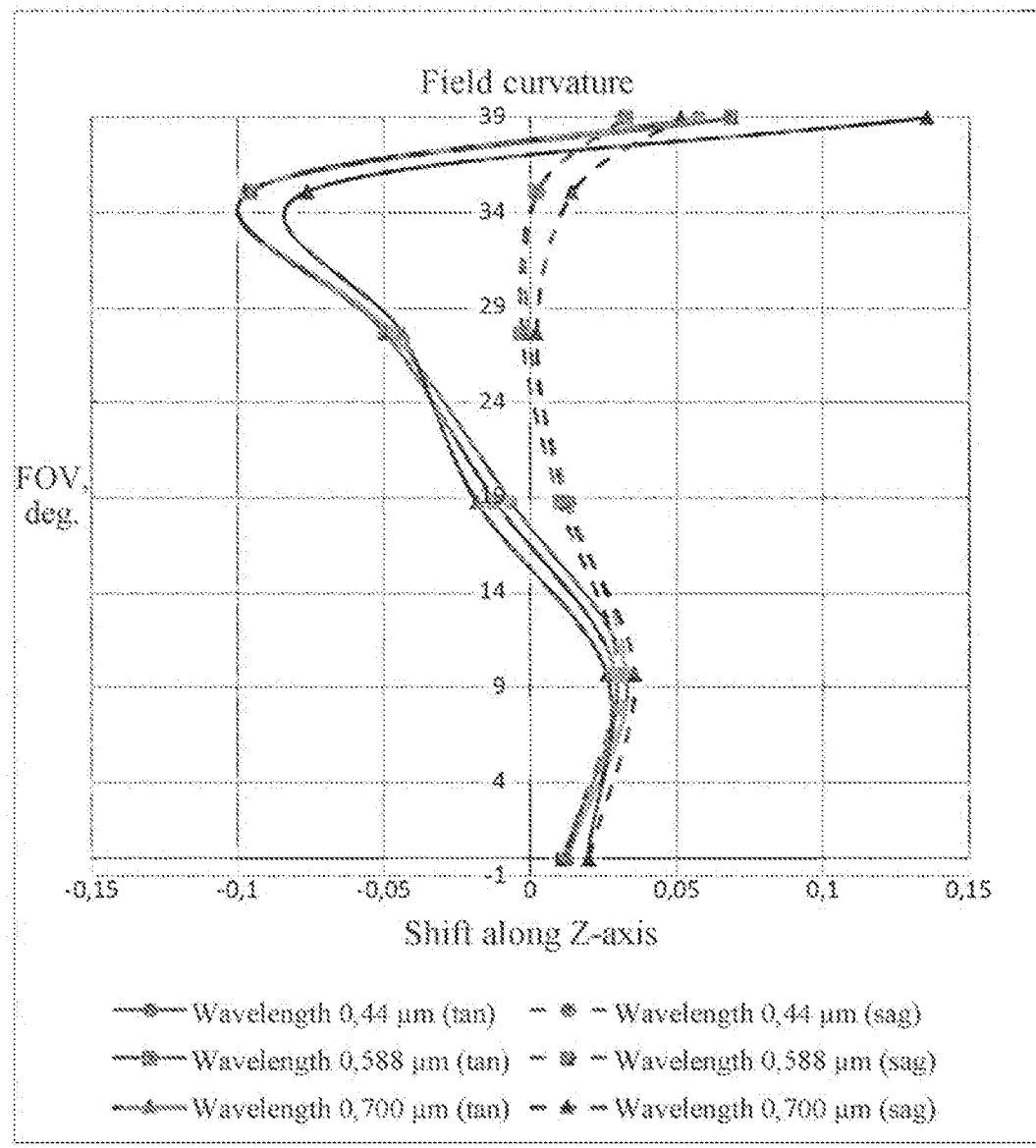
FIG. 11 is a graph illustrating another example of a field curvature of a wide-field imaging lens according to an example embodiment.

FIG. 11 is a graph illustrating another example of a field curvature of a wide-field imaging lens according to an example embodiment.

A curvature of a FOV of the wide-field imaging lens may be represented for wavelengths, for example, 0.440 μm, 0.588 μm, and 0.700 μm. In FIG. 11, a direction of the tangential plane is indicated by a solid line, and a direction of the sagittal plane is indicated by a dotted line.

In the graph of FIG. 11, an abscissa axis represents values of the field curvature, that is, a shift along a Z-axis is in mm, and an ordinate axis represents the FOV of the wide-field imaging lens in degrees.

Figure 12:
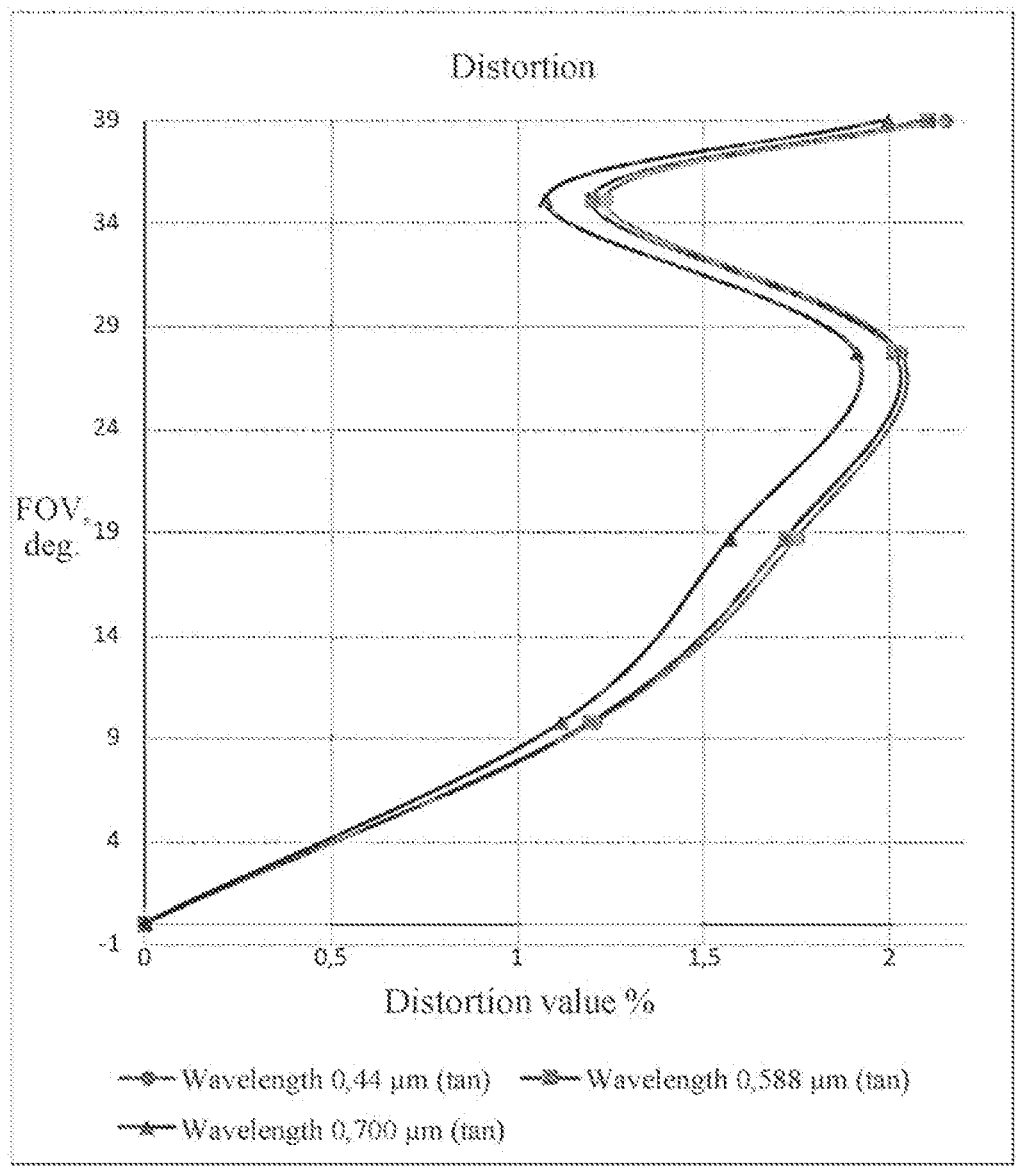
FIG. 12 is a graph illustrating another example of distortion of a wide-field imaging lens according to an example embodiment.

FIG. 12 is a graph illustrating another example of distortion of a wide-field imaging lens according to an example embodiment.

In the graph of FIG. 12, an abscissa axis represents a distortion value as a percentage, and an ordinate axis represents a FOV of the wide-field imaging lens in degrees. In this example, distortion curves are represented for wavelengths, for example, 0.440 μm, 0.588 μm, and 0.700 μm. Also, the distortion of the wide-field imaging lens does not exceed 2%.

Figure 13:
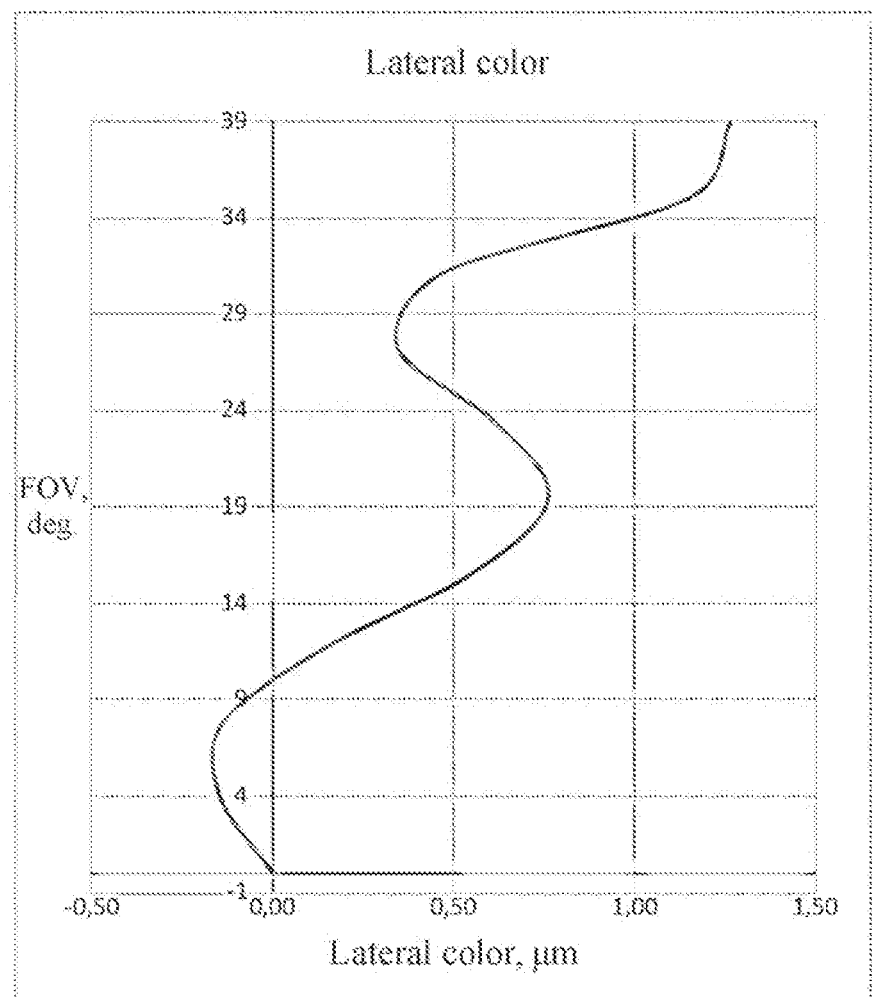
FIG. 13 is a graph illustrating another example of a lateral color of a wide-field imaging lens according to an example embodiment.

FIG. 13 is a graph illustrating another example of a lateral color of a wide-field imaging lens according to an example embodiment. In the graph of FIG. 13, an abscissa axis represents a lateral color value in μm, and an ordinate axis represents a FOV in degrees. In this example, a maximum spread, that is, a difference between a minimum value and a maximum value of the lateral color represented on the abscissa axis, may be 1.6 μm. An indicated chromatic aberration may be taken into consideration for a short wavelength of 0.440 μm and a long wavelength of 0.700 μm, and a maximum image shift for indicated wavelengths may be less than 1.6 μm.

Design and parameters of the wide-field imaging lens and the optical image capturing device according to the other example embodiment may provide a high image resolution. In other words, the contrast (MTF) of all the field points may exceed 0.28 at a spatial frequency of 313 lines/mm, a sensor pixel size may be equal to d of 0.8 μm at TTL of 4.06 mm, and the F-number of the wide-field imaging lens may be 1.8.

ANOTHER EXAMPLE

Hereinafter, a wide-field imaging lens and an optical image capturing device including the wide-field imaging lens and an image sensor 370 are described with reference to FIG. 5.

Figure 5:
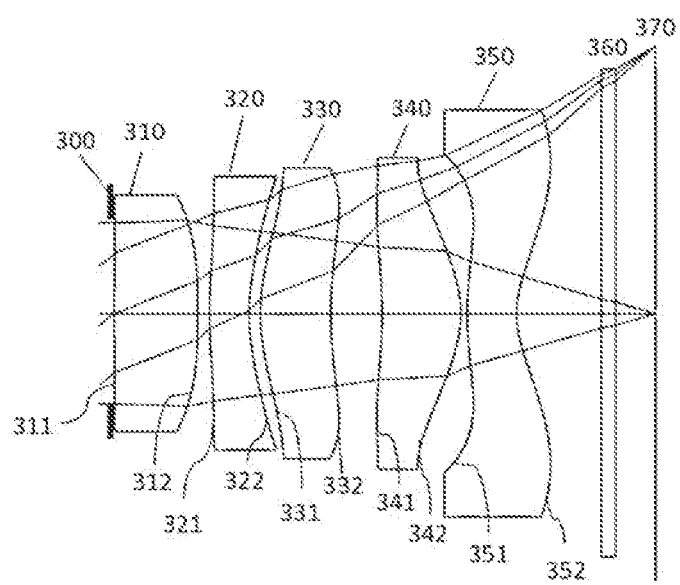
FIG. 5 is a diagram schematically illustrating another example of an optical image capturing device including a wide-field imaging lens according to an example embodiment.

FIG. 5 is a diagram schematically illustrating another example of an optical image capturing device including a wide-field imaging lens according to an example embodiment.

Referring to FIG. 5, the wide-field imaging lens includes five lens elements arranged sequentially along an optical axis of the optical image capturing device from an object side to an image surface (that coincides with the image sensor 370) formed by the wide-field imaging lens. The five lens elements may include, for example, a first lens element 310, a second lens element 320, a third lens element 330, a fourth lens element 340, and a fifth lens element 350.

The first lens element 310 may have positive refractive power, an object-side surface 311 of the first lens element 310 may be concave in a paraxial region of the object-side surface 311, and an image-side surface 312 of the first lens element 310 may be convex in a paraxial region of the image-side surface 312. The object-side surface 311 and the image-side surface 312 of the first lens element 310 may be aspheric surfaces.

The second lens element 320 may have negative refractive power, an object-side surface 321 of the second lens element 320 may be convex in a paraxial region of the object-side surface 321, and an image-side surface 322 of the second lens element 320 may be concave in a paraxial region of the image-side surface 322. The object-side surface 321 and the image-side surface 322 of the second lens element 320 may be aspheric surfaces.

The third lens element 330 may have positive refractive power, an object-side surface 331 of the third lens element 330 may be convex in a paraxial region of the object-side surface 331, and an image-side surface 332 of the third lens element 330 may be convex in a paraxial region of the image-side surface 332. The object-side surface 331 and the image-side surface 332 of the third lens element 330 may be aspheric surfaces.

The fourth lens element 340 may have negative refractive power, an object-side surface 341 of the fourth lens element 340 may be concave in a paraxial region of the object-side surface 341, and an image-side surface 342 of the fourth lens element 340 may be convex in a paraxial region of the image-side surface 342. The object-side surface 341 and the image-side surface 342 of the fourth lens element 340 may be aspheric surfaces.

The fifth lens element 350 may have positive refractive power, an object-side surface 351 of the fifth lens element 350 may be convex in a paraxial region of the object-side surface 351, and an image-side surface 352 of the fifth lens element 350 may be concave in a paraxial region of the image-side surface 352. The object-side surface 351 and the image-side surface 352 of the fifth lens element 350 may be aspheric surfaces.

Each of the first lens element 310 to the fifth lens element 350 may be formed of optical plastic or optical glass.

Table 7 shows a ratio of design parameters of the wide-field imaging lens of FIG. 5.

TABLE 7

| | | | |
|---|---|---|---|
| $(f_1/f) \cdot (1/n_1)$ | 1.35 | $LT_{min}$ | 0.299 mm |
| $(f_2/f) \cdot (1/n_2)$ | −0.98 | FBL/f | 0.33 |
| $(f_3/f) \cdot (1/n_3)$ | 0.68 | OD/CT | (1.40 + 4.14) |
| $(f_1/f) \cdot (1/v_1)$ | 0.048 | OD/ET | (1.87 + 3.91) |
| $(f_2/f) \cdot (1/v_2)$ | −0.085 | ZCRC | (0.697 + 0.959) |

TABLE 7-continued

| | | | |
|---|---|---|---|
| $(f_3/f) \cdot (1/v_3)$ | 0.024 | ICRA | (3.30 + 58.71) deg |
| $|v_4 - v_5|$ | 18.28 | n | (1.690 + 1.743) |
| OT/TTL | 0.359 | CRA | 36.03 deg |
| | | TTL/ImgH | 2.02 |

Predetermined values of a relationship between parameters of the wide-field imaging lens are provided in Table 7, and Equations 1 to 8 below may be satisfied.

$$1.19 < (f1/f) \cdot (1/n1) < 1.35 \qquad \text{[Equation 1]}$$

$$-1.71 < (f2/f) \cdot (1/n2) < -0.94 \qquad \text{[Equation 2]}$$

$$0.48 < (f3/f) \cdot (1/n3) < 1.00 \qquad \text{[Equation 3]}$$

$$0.033 < \left(\frac{f1}{f}\right) \cdot \left(\frac{1}{v1}\right) < 0.048 \qquad \text{[Equation 4]}$$

$$-0.110 < (f2/f) \cdot (1/v3) < -0.060 \qquad \text{[Equation 5]}$$

$$0.013 < (f3/f) \cdot (1/v3) < 0.027 \qquad \text{[Equation 6]}$$

$$0.34 < OT/TTL < 0.5 \qquad \text{[Equation 7]}$$

$$|v_4 - v_5| > 18.0 \qquad \text{[Equation 8]}$$

In Equations 1 to 8, f denotes a focal length of the wide-field imaging lens, $f_1$ denotes a focal length of the first lens element, $f_2$ denotes a focal length of the second lens element, $f_3$ denotes a focal length of the third lens element, $n_1$ denotes a refractive index of the first lens element, $n_2$ denotes a refractive index of the second lens element, $n_3$ denotes a refractive index of the third lens element, $v_1$ denotes an Abbe number of the first lens element, $v_2$ denotes an Abbe number of the second lens element, $v_3$ denotes an Abbe number of the third lens element, $v_4$ denotes an Abbe number of the fourth lens element, $v_5$ denotes an Abbe number of the fifth lens element, OT denotes an overall thickness of the first lens element 310, the second lens element 320 and the third lens element 330, and TTL denotes an axial distance between the object-side surface 311 of the first lens element 310 and the image surface, that is, a total length of the wide-field imaging lens.

In this example, a DOE (see FIG. 1B) may be applied to at least one surface of at least one of the second lens element 220 to the fifth lens element 250, which may significantly contribute to elimination of chromatic aberrations and geometric aberrations. The DOE may have a relief-phase annular microstructure on a flat or curved surface with a pitch comparable to a wavelength of radiation.

Also, the optical image capturing device of FIG. 5 may further include an aperture stop 300 located at the first lens element 310 on an object side, and a filter 360 located between the fifth lens element 350 and the image surface. All of the above components of the optical image capturing device may be optically coupled to each other with a possibility of forming an image on a working surface of the image sensor 370.

The image sensor 370 may be a photodetector array that may detect electromagnetic radiation in a range of 0.4 to 0.7 μm, and a size of a sensor pixel may range from 0.7 pin to 1 μm.

The filter 360 may be formed of optical glass, and may be an IR filter designed to cancel noise occurring when IR radiation with a wavelength exceeding 0.8 μm is recorded.

Table 8 shows design parameters of the wide-field imaging lens of FIG. 5.

TABLE 8 f = 2.46 mm, Fno = 1.8, HFOV = 39 deg

| Surface | | Curvature Radius | Thickness | Index | Abbe # | Focal lens |
|---|---|---|---|---|---|---|
| 0 | Object | Plano | Inf | | | |
| 1 | Ape.Stop | Plano | −2.372e−04 | | | |
| 2 | Lens 1 | 9.194 | 0.640 | 1.743 | 49.30 | 5.77 |
| 3 | | −7.803 | 0.088 | | | |
| 4 | Lens 2 | 3.742 | 0.299 | 1.671 | 19.25 | −4.04 |
| 5 | | 1.523 | 0.085 | | | |
| 6 | Lens 3 | 1.374 | 0.533 | 1.743 | 49.30 | 2.93 |
| 7 | | 3.115 | 0.383 | | | |
| 8 | Lens 4 | −3.343 | 0.596 | 1.743 | 49.30 | 1.38 |
| 9 | | −0.846 | 0.049 | | | |
| 10 | Lens 5 | 2.627 | 0.373 | 1.690 | 31.02 | −1.51 |
| 11 | | 0.701 | 0.646 | | | |
| 12 | Filter | Plano | 0.11 | 1.517 | 64.20 | |
| 13 | | Plano | 0.3 | | | |
| 14 | Image | Plano | | | | |

The design parameters of Table 8 may include the following parameters:

F-number Fno=1.8;

A focal length of the wide-field imaging lens=2.46 mm; and

Half of a maximum field of view HFOV=39°.

Also, in Table 8, a radius of a curvature, a thickness, and a focal length are represented in mm.

Numbering of surfaces of lens elements from 1 to 14 in Table 8 may indicate the surfaces in an order from an object to an image. In this case, referring to FIG. 5, Lenses 1 to 5 shown in Table 8 represent the first lens element 310 to the fifth lens element 350, respectively.

Also, in Table 8, in a column thickness relative to positions L1 to L5, two values are represented. A first value may indicate a thickness of a lens element itself, and a second value may indicate a distance to a next lens element.

Table 9 shows aspheric coefficient values of surfaces of the wide-field imaging lens of FIG. 5.

locations from an object to an image. In Table 9, surface #2 may correspond to the object-side surface 311 of the first lens element 310. At the same time, Table 9 shows values of A2 to A16 aspheric coefficients of 2nd to 16th orders that are k-conical coefficients of surfaces of lens elements.

In this example, profiles of aspheric surfaces of the first lens element 310 to the fifth lens element 350 of the wide-field imaging lens will be described by Equation 18.

If aspheric surfaces are used, field aberrations may be corrected with a small number of lens elements (in this example, five lens elements), which may ensure compactness of an optical scheme.

In addition, one of important parameters of the wide-field imaging lens may be a frequency-contrast characteristic. The frequency-contrast characteristic may be measuring of a resolution of a lens. The wide-field imaging lens of FIG. 5 may have a frequency-contrast characteristic that an MTF is greater than 0.25 at a spatial frequency SF of 313 lines/mm. Also, the F-number may be 1.8.

Figure 14:
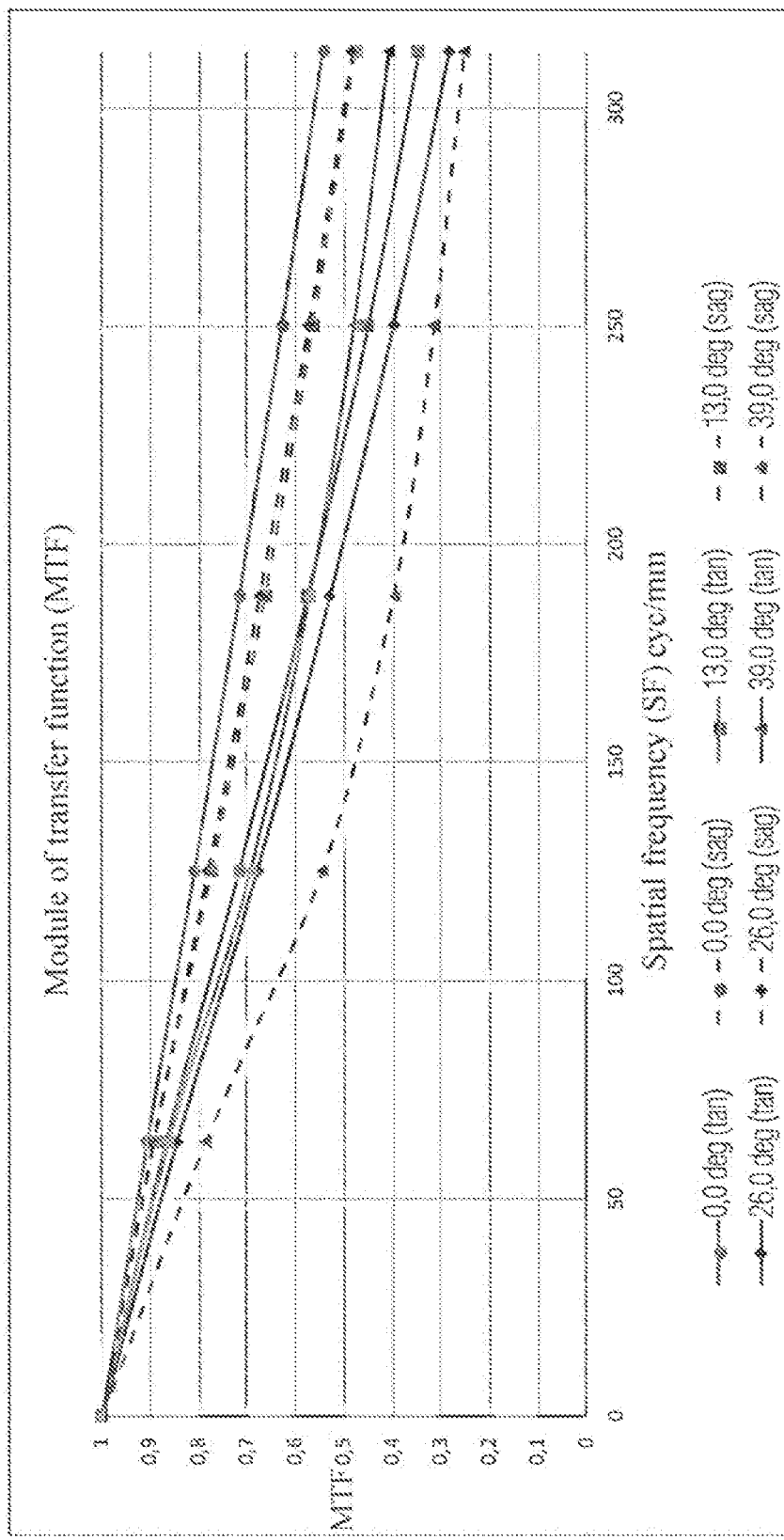
FIG. 14 is a graph illustrating another example of characteristics of an MTF for different field points of a wide-field imaging lens according to an example embodiment.

FIG. 14 is a graph illustrating another example of characteristics of an MTF for different field points of a wide-field imaging lens according to an example embodiment.

The graph of FIG. 14 shows frequency-contrast characteristics of the wide-field imaging lens for various field points (for example, 0.0°, 13.0°, 26.0°, and 38.0°) depending on a spatial frequency SF. In other words, FIG. 14 shows a contrast in which different frequencies are resolved. A maximum frequency is 313 lines/mm and the contrast (MTF) of all field points exceeds 0.25.

In the graph of FIG. 14, an abscissa axis represents a spatial frequency in lines/mm, and an ordinate axis represents the MTF, which indicates a contrast of an image.

Curves of FIG. 14 represent MTF for different field points (for example, 0.0°, 13.0°, 26.0°, and 38.0°) for two sections, that is, a tangential plane (YZ) and a sagittal plane (XZ).

Figure 15:
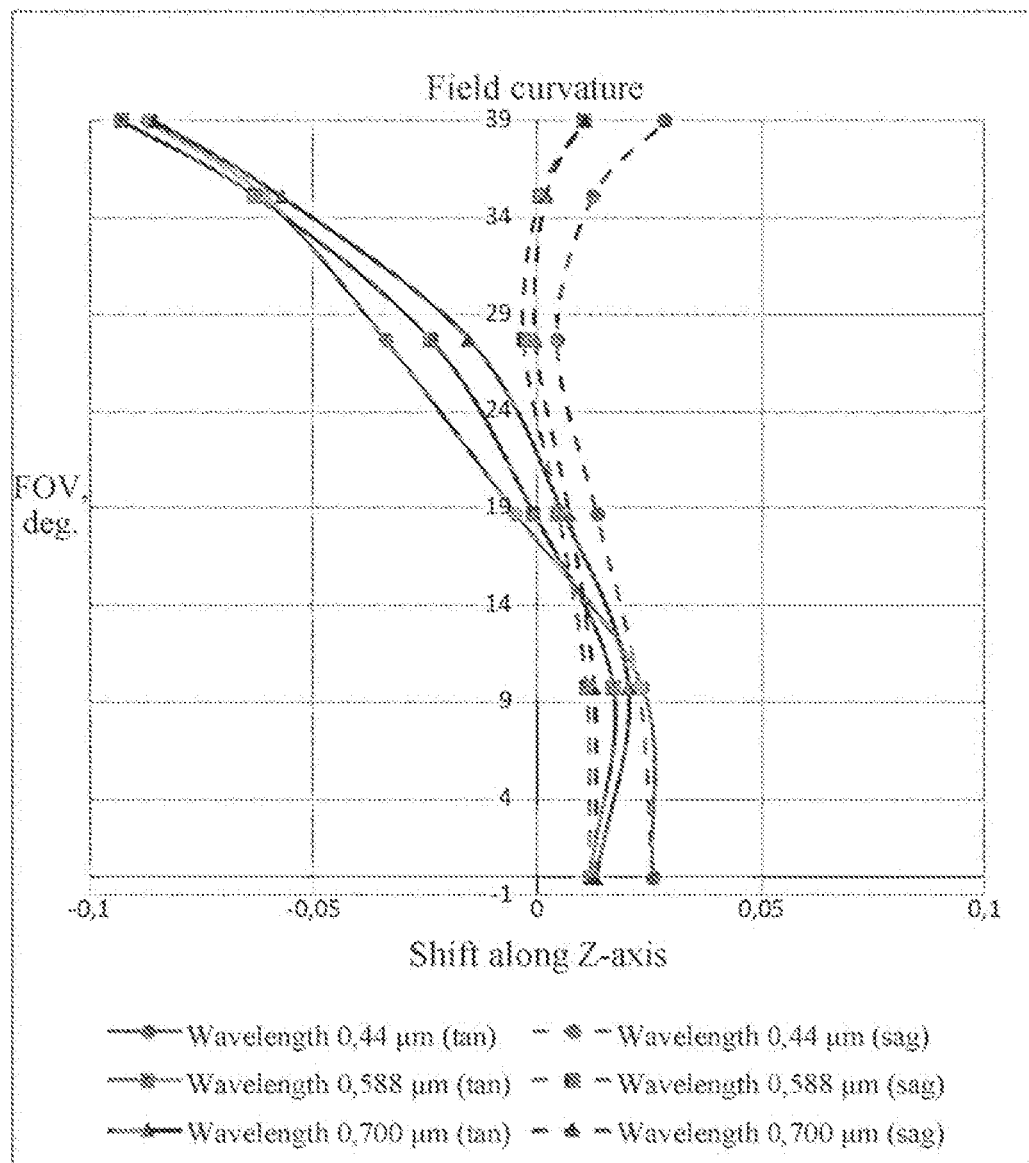
FIG. 15 is a graph illustrating another example of a field curvature of a wide-field imaging lens according to an example embodiment.

FIG. 15 is a graph illustrating another example of a field curvature of a wide-field imaging lens according to an example embodiment.

A curvature of a FOV of the wide-field imaging lens may be represented for wavelengths, for example, 0.440 μm, 0.588 μm, and 0.700 μm. In FIG. 15, a direction of the

TABLE 9

| Surface # | 2 | 3 | 4 | 5 | 6 |
|---|---|---|---|---|---|
| k= | 6.3934E+01 | 6.0966E+01 | 1.2658E+01 | −1.4704E+01 | −9.6439E+00 |
| A2= | 0 | 0 | 0 | 0 | 0 |
| A4= | −9.6212E−02 | −2.3287E−01 | −2.4258E−01 | −3.9891E−02 | −4.3622E−02 |
| A6= | −5.2263E−02 | 1.1290E−01 | 1.0607E−01 | 1.5011E−01 | −3.7080E−03 |
| A8= | | | 4.7867E−02 | −1.5508E−01 | |
| A10= | | | −9.7986E−02 | 5.9947E−02 | |
| A12= | 0 | 0 | 0 | 0 | 0 |
| A14= | 0 | 0 | 0 | 0 | 0 |
| A16= | 0 | 0 | 0 | 0 | 0 |

| Surface # | 7 | 8 | 9 | 10 | 11 |
|---|---|---|---|---|---|
| k= | −1.0356E+00 | 4.2287E+00 | −5.1957E+00 | 2.798E+00 | −5.649E+00 |
| A2= | 0 | 0 | 0 | 0 | 0 |
| A4= | −5.8072E−02 | 1.9805E−01 | −3.2105E−02 | −2.1212E−01 | −1.0197E−01 |
| A6= | −6.8305E−02 | −5.7716E−02 | 5.3275E−02 | −3.5094E−02 | 1.3780E−02 |
| A8= | | | | | |
| A10= | | | | | |
| A12= | 0 | 0 | 0 | 0 | 0 |
| A14= | 0 | 0 | 0 | 0 | 0 |
| A16= | 0 | 0 | 0 | 0 | 0 |

Table 9 shows the aspheric coefficient values of the surfaces of the wide-field imaging lens in an order of tangential plane is indicated by a solid line, and a direction of the sagittal plane is indicated by a dotted line.

In the graph of FIG. 15, an abscissa axis represents values of the field curvature, that is, a shift along a Z-axis is in mm, and an ordinate axis represents the FOV of the wide-field imaging lens in degrees.

Figure 16:
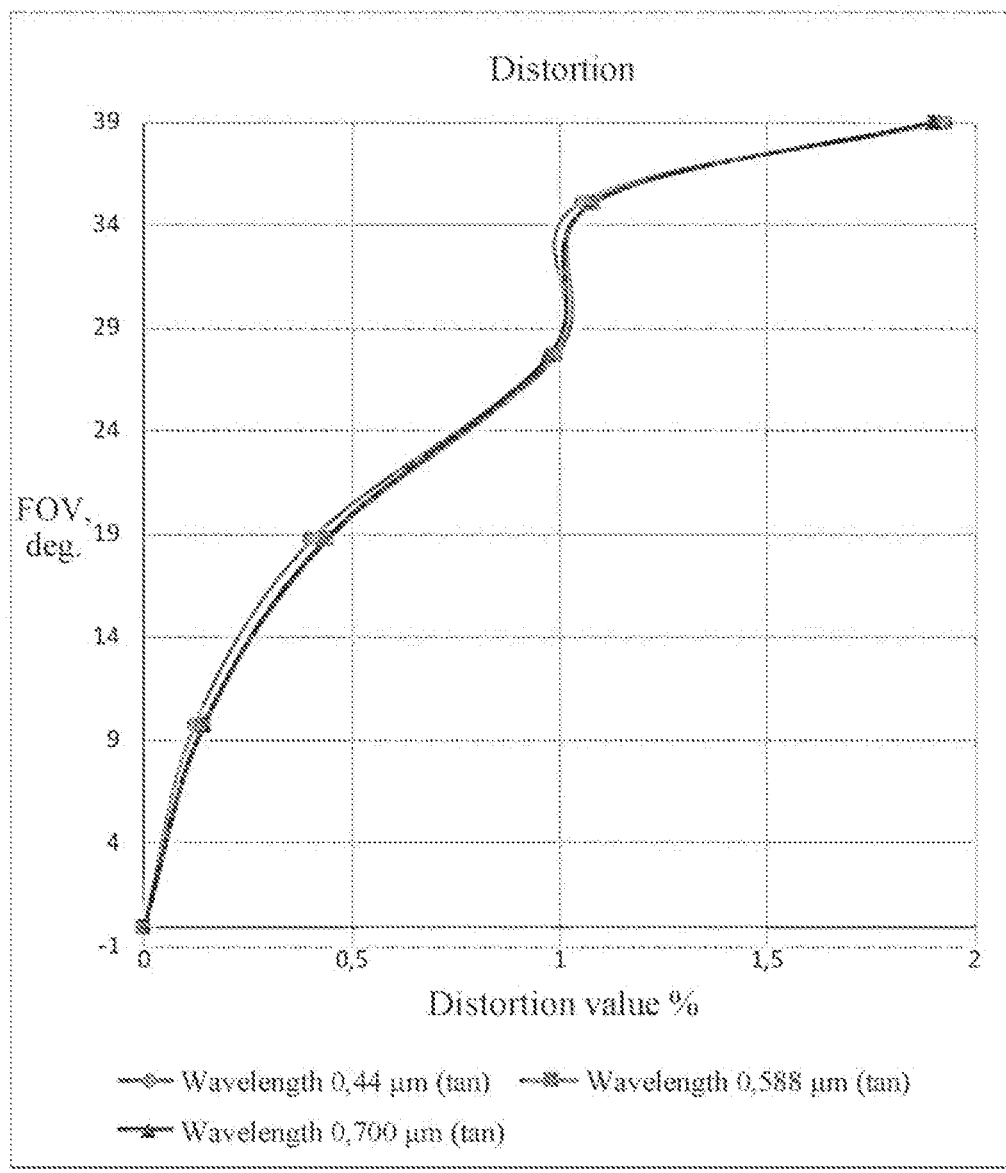
FIG. 16 is a graph illustrating another example of distortion of a wide-field imaging lens according to an example embodiment.

FIG. 16 is a graph illustrating another example of distortion of a wide-field imaging lens according to an example embodiment.

In the graph of FIG. 16, an abscissa axis represents a distortion value as a percentage, and an ordinate axis represents a FOV of the wide-field imaging lens in degrees. In this example, distortion curves are represented for wavelengths, for example, 0.440 μm, 0.588 μm, and 0.700 μm. Also, the distortion of the wide-field imaging lens does not exceed 1.91%.

Figure 17:
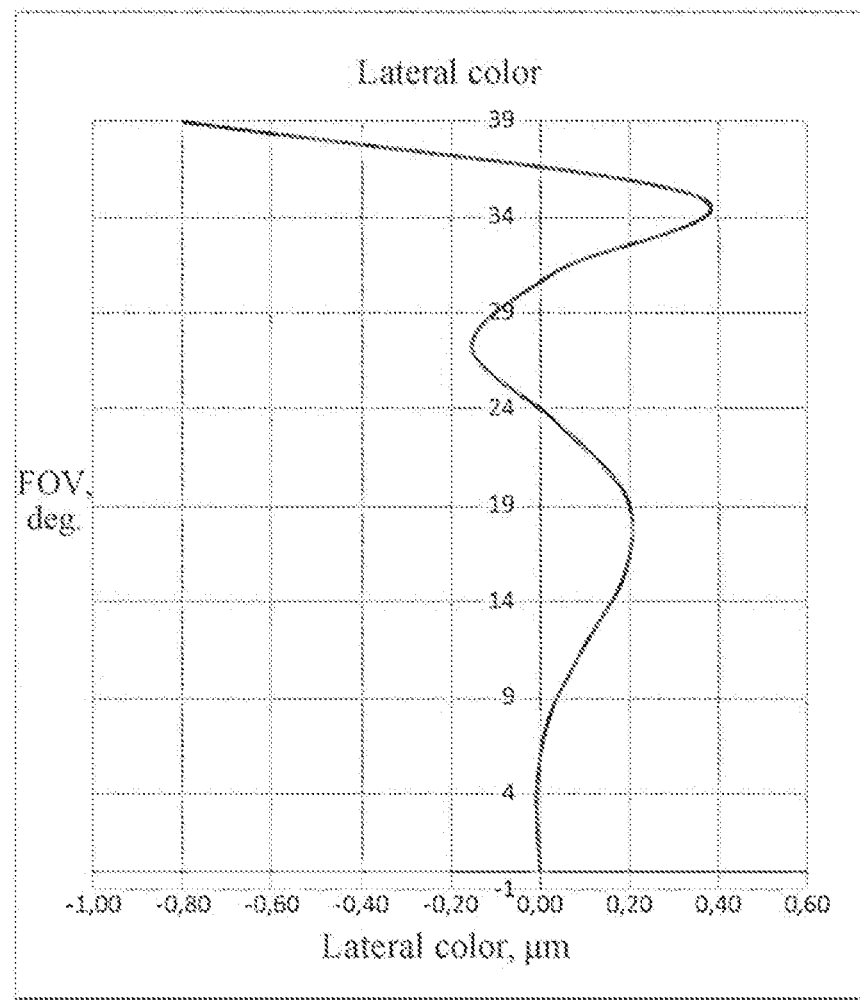
FIG. 17 is a graph illustrating another example of a lateral color of a wide-field imaging lens according to an example embodiment.

FIG. 17 is a graph illustrating another example of a lateral color of a wide-field imaging lens according to an example embodiment. In the graph of FIG. 17, an abscissa axis represents a lateral color value in μm, and an ordinate axis represents a FOV in degrees. In this example, a maximum spread, that is, a difference between a minimum value and a maximum value of the lateral color represented on the abscissa axis, may be 1.16 μm. An indicated chromatic aberration may be taken into consideration for a short wavelength of 0.440 μm and a long wavelength of 0.700 μm, and a maximum image shift for indicated wavelengths may be less than 1.6 μm.

Design and parameters of the wide-field imaging lens and the optical image capturing device according to the other example embodiment may provide a high image resolution. In other words, the contrast (MTF) of all the field points may exceed 0.25 at a spatial frequency of 313 lines/mm, a sensor pixel size may be equal to d of 0.8 μm at TTL of 4.1 mm, and the F-number of the wide-field imaging lens may be 1.8.

The wide-field imaging lens and the optical image capturing device according to the present disclosure may be widely applicable to various digital input and/or output devices, for example, a digital video camera, a digital still camera, a personal computer with a camera, or a personal digital assistant (PDA) with a camera.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A wide-field imaging lens comprising an aperture stop, a first lens element, a second lens element, a third lens element, a fourth lens element, and a fifth lens element that are located along an optical axis in a sequence from an object side to an image side, wherein each of the first lens element, the second lens element, the third lens element, the fourth lens element, and the fifth lens element has an aspheric surface, the first lens element has a first positive refractive power, a first object-side surface, and a first image-side surface, the second lens element has a first negative refractive power, a second object-side surface that is convex in a paraxial region of the second object-side surface, and a second image-side surface that is concave in a paraxial region of the second image-side surface, the third lens element has a second positive refractive power, a third object-side surface that is convex in a paraxial region of the third object-side surface, and a third image-side surface that is convex in a paraxial region of the third image-side surface, the fourth lens element and the fifth lens element have opposite refractive powers, the fourth lens element has a fourth object-side surface that is concave in a paraxial region of the fourth object-side surface, and a fourth image-side surface that is convex in a paraxial region of the fourth image-side surface, and the fifth lens element has a fifth object-side surface that is convex in a paraxial region of the fifth object-side surface, and a fifth image-side surface that is concave in a paraxial region of the fifth image-side surface, wherein the first lens element is configured to satisfy Equation 1:

$$1.19 < (f_1/f) \cdot (1/n_1) < 1.35 \qquad \text{[Equation 1]}$$

in which f denotes a focal length of the wide-field imaging lens, $f_1$ denotes a focal length of the first lens element, and $n_1$ denotes a refractive index of the first lens element, the first object-side surface of the first lens element is convex in a paraxial region of the first object-side surface, and the first image-side surface of the first lens element is convex in a paraxial region of the first image-side surface.

2. The wide-field imaging lens of claim 1, wherein the fourth lens element has a third positive refractive power, and the fifth lens element has a second negative refractive power.

3. The wide-field imaging lens of claim 1, wherein the fourth lens element has a second negative refractive power, and the fifth lens element has a third positive refractive power.

4. The wide-field imaging lens of claim 1, wherein the first lens element, the second lens element, the third lens element, the fourth lens element, and the fifth lens element are configured to satisfy Equations 2 to 8:

$$-1.71 < (f2/f) \cdot (1/n2) < -0.94 \qquad \text{[Equation 2]}$$

$$0.48 < (f3/f) \cdot (1/n3) < 1.00 \qquad \text{[Equation 3]}$$

$$0.033 < \left(\frac{f1}{f}\right) \cdot \left(\frac{1}{v1}\right) < 0.048 \qquad \text{[Equation 4]}$$

-continued $$-0.110 < (f2/f) \cdot (1/\nu 2) < -0.060 \quad \text{[Equation 5]}$$

$$0.013 < (f3/f) \cdot (1/\nu 3) < 0.027 \quad \text{[Equation 6]}$$

$$0.34 < OT/TTL < 0.5 \quad \text{[Equation 7]}$$

$$|\nu_4 - \nu_5| > 18.0 \quad \text{[Equation 8]}$$

in which $f_2$ denotes a focal length of the second lens element, $f_3$ denotes a focal length of the third lens element, $n_2$ denotes a refractive index of the second lens element, $n_3$ denotes a refractive index of the third lens element, $\nu_1$ denotes an Abbe number of the first lens element, $\nu_2$ denotes an Abbe number of the second lens element, $\nu_3$ denotes an Abbe number of the third lens element, $\nu_4$ denotes an Abbe number of the fourth lens element, $\nu_5$ denotes an Abbe number of the fifth lens element, OT denotes an overall thickness of the first lens element, the second lens element and the third lens element, and TTL denotes an axial distance between the first object-side surface of the first lens element and an image surface.

5. The wide-field imaging lens of claim 1, further comprising:
a diffractive optical element (DOE) applied to at least one surface of at least one of the first lens element, the second lens element, the third lens element, the fourth lens element, and the fifth lens element.

6. The wide-field imaging lens of claim 5, wherein the DOE has a relief-phase annular microstructure provided on a flat or curved surface with a pitch that corresponds to a wavelength of radiation.

7. The wide-field imaging lens of claim 1, further comprising:
a diffractive optical element (DOE) having a relief-phase annular microstructure is applied to one of two opposing surfaces of the fourth lens element which faces the fifth lens element.

8. The wide-field imaging lens of claim 1, wherein at least one of the first lens element, the second lens element, the third lens element, the fourth lens element, and the fifth lens element is formed of plastic.

9. The wide-field imaging lens of claim 1, wherein at least one of the first lens element, the second lens element, the third lens element, the fourth lens element, and the fifth lens element is formed of optical glass.

10. An optical image capturing device comprising a wide-field imaging lens, an infrared (IR) filter and a sensor that are optically coupled, wherein
the wide-field imaging lens comprises an aperture stop, a first lens element, a second lens element, a third lens element, a fourth lens element, and a fifth lens element that are located along an optical axis in a sequence from an object side to an image side,
each of the first lens element, the second lens element, the third lens element, the fourth lens element, and the fifth lens element has an aspheric surface,
the first lens element has a first positive refractive power, a first object-side surface, and a first image-side surface,
the second lens element has a first negative refractive power, a second object-side surface that is convex in a paraxial region of the second object-side surface, and a second image-side surface that is concave in a paraxial region of the second image-side surface,
the third lens element has a second positive refractive power, a third object-side surface that is convex in a paraxial region of the third object-side surface, and a third image-side surface that is convex in a paraxial region of the third image-side surface,
the fourth lens element and the fifth lens element have opposite refractive powers,
the fourth lens element has a fourth object-side surface that is concave in a paraxial region of the fourth object-side surface, and has a fourth image-side surface that is convex in a paraxial region of the fourth image-side surface, and
the fifth lens element has a fifth object-side surface that is convex in a paraxial region of the fourth object-side surface, and has a fifth image-side surface of the fifth lens element that is concave in a paraxial region of the fifth image-side surface,
the optical image capturing device satisfies [Equation 11] and [Equation 17],
[Equation 11] is expressed as $$0.32 < \frac{BFL}{f} < 0.33,$$

in which BFL denotes a back segment of a focal length measured from the fifth image-side surface of the fifth lens element to an image surface, without including a depth of the IR filter,
[Equation 17] is expressed as $$2.02 < \frac{TTL}{ImgH} < 2.13,$$

in which TTL denotes an axial distance between the first object-side surface of the first lens element and an image surface, and ImgH denotes one-half of a diagonal length of a resulting image.

11. The optical image capturing device of claim 10, wherein
the first object-side surface of the first lens element is convex in a paraxial region of the first object-side surface, and
the first image-side surface of the first lens element is convex in a paraxial region of the first image-side surface.

12. The optical image capturing device of claim 10, wherein
the first object-side surface of the first lens element is concave in a paraxial region of the first object-side surface, and
the first image-side surface of the first lens element is convex in a paraxial region of the first image-side surface.

13. The optical image capturing device of claim 10, wherein
the fourth lens element has a third positive refractive power, and
the fifth lens element has a second negative refractive power.

14. The optical image capturing device of claim 10, wherein
the fourth lens element has a second negative refractive power, and
the fifth lens element has a third positive refractive power.

15. The optical image capturing device of claim 10, wherein the sensor is a photodetector array.

16. The wide-field imaging lens of claim 1, wherein Equation 14 below is satisfied:

$$1.545 < n < 1.743 \quad \text{[Equation 14]}$$

in which n denotes a refractive index of each of the first lens element, the second lens element, the third lens element, the fourth lens element, and the fifth lens element.

17. The optical image capturing device of claim 11, wherein the sensor is a photodetector array.

* * * * *